United States Patent
Vronay et al.

(10) Patent No.: US 8,028,250 B2
(45) Date of Patent: Sep. 27, 2011

(54) USER INTERFACE HAVING A CAROUSEL VIEW FOR REPRESENTING STRUCTURED DATA

(75) Inventors: David Vronay, Beijing (CN); Shuo Wang, Beijing (CN); Ioannis Paniaras, Vienna, VA (US); Francisco L. Yu, Jr., Beijing (CN); Martijn Eldert Van Tilburg, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1221 days.

(21) Appl. No.: 10/931,302

(22) Filed: Aug. 31, 2004

(65) Prior Publication Data

US 2006/0048076 A1    Mar. 2, 2006

(51) Int. Cl.
*G06F 3/048* (2006.01)
(52) U.S. Cl. ........ 715/853; 715/764; 715/841; 715/848; 715/851; 715/855
(58) Field of Classification Search .......... 715/755–777, 715/779, 781, 783–787, 810, 825, 828–835, 715/838, 841, 848–851, 853–855
See application file for complete search history.

(56) References Cited

U.S. PATENT DOCUMENTS

| | | | | |
|---|---|---|---|---|
| 5,295,243 A | * | 3/1994 | Robertson et al. | 715/848 |
| 5,485,197 A | * | 1/1996 | Hoarty | 725/37 |
| 5,767,854 A | * | 6/1998 | Anwar | 715/848 |
| 6,219,053 B1 | * | 4/2001 | Tachibana et al. | 715/835 |
| 6,252,597 B1 | * | 6/2001 | Lokuge | 715/841 |
| 6,414,677 B1 | * | 7/2002 | Robertson et al. | 345/419 |
| 6,448,987 B1 | * | 9/2002 | Easty et al. | 715/834 |
| 6,544,123 B1 | * | 4/2003 | Tanaka et al. | 463/36 |
| 6,618,063 B1 | * | 9/2003 | Kurtenbach | 715/834 |
| 7,086,012 B1 | * | 8/2006 | Perttunen | 715/853 |
| 7,350,158 B2 | * | 3/2008 | Yamaguchi et al. | 715/834 |
| 2002/0030702 A1 | * | 3/2002 | Gould et al. | 345/850 |
| 2002/0054164 A1 | * | 5/2002 | Uemura | 345/848 |
| 2002/0145623 A1 | * | 10/2002 | Decombe | 345/734 |
| 2003/0048309 A1 | * | 3/2003 | Tambata et al. | 345/810 |
| 2003/0197740 A1 | * | 10/2003 | Reponen | 345/810 |
| 2004/0250217 A1 | * | 12/2004 | Tojo et al. | 715/810 |
| 2005/0044509 A1 | * | 2/2005 | Hunleth et al. | 715/810 |
| 2005/0086611 A1 | * | 4/2005 | Takabe et al. | 715/823 |
| 2005/0091596 A1 | * | 4/2005 | Anthony et al. | 715/712 |
| 2005/0138564 A1 | * | 6/2005 | Fogg | 715/745 |
| 2006/0218478 A1 | * | 9/2006 | Nonclercq et al. | 715/500 |
| 2007/0028267 A1 | * | 2/2007 | Ostojic et al. | 725/52 |
| 2007/0226640 A1 | * | 9/2007 | Holbrook et al. | 715/765 |

OTHER PUBLICATIONS

Andy Cockburn, Bruce McKenzie, An Evaluation of Cone Trees, 2000, 1-15.*

* cited by examiner

*Primary Examiner* — Kieu Vu
*Assistant Examiner* — Yongjia Pan
(74) *Attorney, Agent, or Firm* — Lee & Hayes, PLLC

(57) ABSTRACT

A carousel view is described. In an implementation, a method includes determining a number of items that are included in data. A carousel is then generated for output in a user interface. The carousel has a plurality of bins, each of which representing a corresponding one of the items. The carousel has a radius for display of each of the bins based on the determined number of items.

31 Claims, 14 Drawing Sheets

US 8,028,250 B2

USER INTERFACE HAVING A CAROUSEL VIEW FOR REPRESENTING STRUCTURED DATA

TECHNICAL FIELD

The present invention generally relates to the field of user interfaces and more particularly relates to a user interface having a carousel view.

BACKGROUND

Users are continually exposed to ever increasing amounts of information. For example, a user may perform a search using a search engine to locate web sites of interest, may peruse an address book to locate a particular contact, may navigate through songs in a playlist, locate a particular file on a computer, and so on. Each of these items may be displayed utilizing a variety of techniques so that the user may locate a particular item of interest.

Once such technique utilized to display a collection of items in a user interface is referred to as a "list view". In a list view, each item of the list is allocated a portion of a display area in which to be rendered. The portions corresponding to each of the items in the list are then arranged, such as placed in an order, one after another, placed in a grid, and so on. The list may be configured such that geometric location of the items in the list reflects a property of the items. For example, items in a list may be arranged in alphabetical order, date created, when modified, and so on. If there are more items in the list than fit on the display area at any one time, the user may scroll through the list to reveal the additional items that would not be displayed otherwise.

List views, however, are typically unable to show complicated relationships between the items in the list. For example, traditional list views are unable to show hierarchical data structures, such as organizational charts, directory trees, and so one. A traditional list view, for instance, may sequentially order items in the list, one after another, but cannot be utilized to show an organizational chart because of the inability of the list view to show hierarchical relationships that exist in addition to the sequential ordering of the items.

In order to show hierarchical data structures, a "tree view" may be utilized. A tree view displays items in a list. However, each item in the list in a tree view can also include another list of items displayed "above" or "below" it in a tree. Typically, the items at one level of the tree are spaced further apart to allow room for the items at the next level of the tree. Accordingly, tree views are also limited by the number of items in the list than fit on the display area at any one time. Therefore, the user must scroll through the items in a tree view to reveal additional items that would not be displayed otherwise. Further, if there are more hierarchical levels in the tree than can be displayed at any one time, the user must also scroll through the levels to determine the relationship(s), if any, of items in one hierarchical level of the tree with items in another hierarchical level of the tree. Therefore, these traditional ways of viewing collections of items do not allow a user to readily judge a size of a result that has more items than can be viewed on the user interface at any one time.

Accordingly, there is a continuing need for improved techniques for viewing collections of items.

SUMMARY

A carousel view is described for use in a user interface. The carousel view may provide a variety of functionality for visualizing and navigating an arbitrary graph of information in the user interface. For example, the carousel view may provide a display of a carousel having a plurality of bins. The plurality of bins may be arranged at a distance (e.g., a radius) from a common point to form the carousel. Each of the bins may be utilized to store an item included in data, such as a song from a playlist, a contact in an address book, and so on. A user may rotate (e.g., spin) the carousel to locate a particular bin that represents a desired item.

The carousel view may be configured to show a large number of items in a limited display area. For example, the carousel may include a "clipping area" which represents items that cannot be displayed in the user interface at that time. Even though a clipping area may be utilized, the carousel may still provide a user with the ability to compare the relative sizes of two or more collections of items. For instance, each carousel may be configured to have a radius based on the number of items in the carousel. Therefore, a user may compare carousels, one to another, to determine the relative sizes of the carousels, even if one or more of them include a clipping area. Further, a plurality of carousels may be arranged to represent hierarchical data, thereby providing the user with distinct "glance-able" shapes for a particular set of related items that facilitate user understanding and comparison of structures defined by the items.

BRIEF DESCRIPTION OF THE DRAWINGS

The same reference numbers are utilized in instances in the discussion to reference like structures and components.

DETAILED DESCRIPTION

Overview

Figure 1:
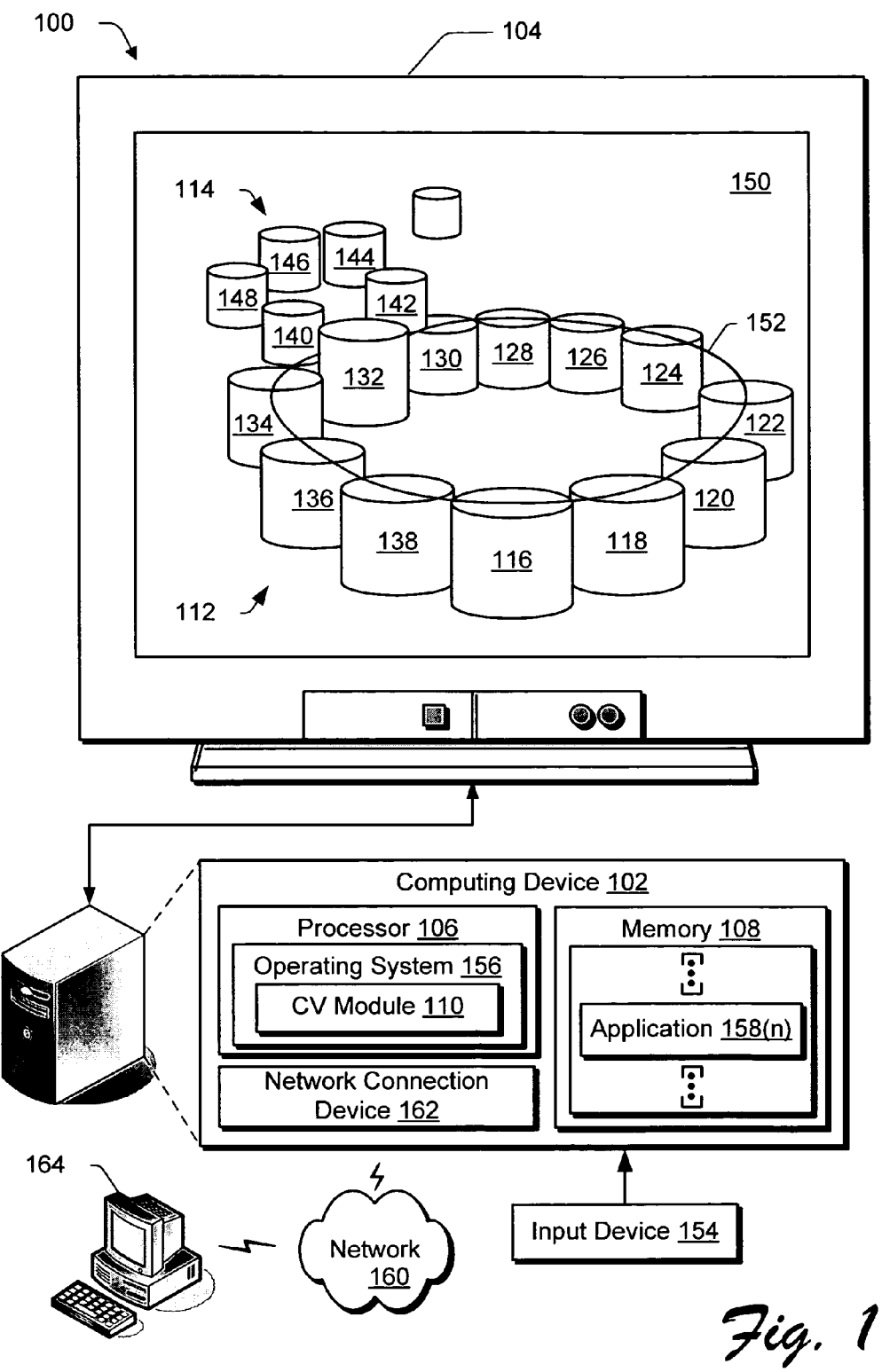
FIG. 1 is an illustration of an environment in an exemplary implementation that is operable to employ a carousel view.

A carousel view is described which provides a variety of techniques for visualizing and navigating an arbitrary graph of information. As previously described, a carousel view may provide a display of a carousel having a plurality of bins. The plurality of bins, each representing an item in a collection of data, may be arranged at a distance (e.g., a radius) from a common point to form the carousel. The bins may be configured in a variety of ways to represent a corresponding item, such as a graphical depiction of the item (e.g., a thumbnail picture), an icon, a container having a textual description of the corresponding item, and so on. A user may rotate (e.g., spin) the carousel to locate a particular bin that represents a desired item.

A carousel may be utilized to display a wide variety of items in a manner which optimizes use of a display area in a user interface. For example, when a small number of items is received (e.g., less than eight), the carousel view may output a carousel having a bin for each of the items such that each of the bins is selectable by a user. When a larger number of items are received (e.g., more than eight), spacing between bins in the carousel may be arranged accordingly. For instance, bins in the carousel that are positioned for selection by a user (e.g., located in the "front" of a display area) may be spaced further apart than bins which are not positioned for selection by the user (e.g., bins located in the "back" of the display area). In another instance, an even larger number of items may be received (e.g., more than twelve) such that bins corresponding to each of the items are not concurrently displayable. Therefore, the carousel may be configured to employ a "clipping area". The clipping area of the carousel represents items in the carousel which are not currently displayable on the display device. The clipping area may be represented in a variety of ways, such as a "blanked-out" area of the carousel, a tunnel, mist, a cloud, and so on. As the carousel is rotated, bins may appear to "enter" and "leave" the clipping area, thereby conserving space in the display area utilized to display the carousel.

The carousel view may also be configured to describe a relative number of items in the carousel. The carousel view, for instance, may include a plurality of carousels, each of which having a radius that is calculated based on a number of items in the respective carousel. For example, the radius may be a function of the number of items in the respective carousel such that a carousel that represents a large number of items (e.g., 100 items) is larger that a carousel that represents a small number of items (e.g., less than 12 items). Thus, a user may compare the carousels, one to another, based on the relative "size" of the carousels without having to manually count the number of items in the carousels, even if one or both of the carousels employ a clipping area.

A hierarchical carousel view may also be provided for representing hierarchical data. For example, data may be received which includes a plurality of hierarchical levels. A carousel may be provided for each of the levels and that includes bins which represent items in the data at that level. The carousels for each of the hierarchical levels may also be arranged in accordance with the hierarchy, such as arranged in an order that corresponds to an order of the hierarchical levels. Through arrangement of the carousels, a user may be provided with glanceable shapes that aid the user's understanding of the data represented by the carousels. For example, multiple carousels may indicate multiple hierarchical levels, radii of the respective carousels may indicate a number of items in the respective carousels, and so on, such that an overall shape of the hierarchical data is provided for interpretation by the user. Further discussion of these and other features may be found in starting in relation to FIG. 2 after discussion of an exemplary environment in the following section which is operable to employ the user interface having a carousel view.

Exemplary Environment

FIG. 1 is an illustration of an environment 100 operable to provide a user interface having a carousel view. The environment 100 is illustrated as having a computing device 102. Although the computing device 102 is illustrated as a desktop personal computer (PC), the computing device 102 may be configured in a variety of ways, such as a set-top box, a notebook computer, a tablet PC, a personal digital assistance (PDA), an information appliance, a game console, a wireless phone, and so on. The computing device 102 may range from a full resource device with substantial memory and processor resources (e.g., PCs, television recorders equipped with hard disk) to a low-resource device with limited memory and/or processing resources (e.g., traditional set-top boxes).

The computing device 102 is communicatively coupled to a display device 104 for providing a visual output to a user. Although the display device 104 is illustrated as separate from the computing device 102, in another implementation the computing device 102 includes the display device 104, such as a wireless phone, a television having an integrated set-top box, and so forth.

The computing device 102 includes a processor 106 and memory or computer-readable storage media 108. The processor 106 is not limited by the materials from which it is formed or the processing mechanisms employed therein. For example, the processor 106 may be formed from semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 108 is shown, a wide variety of types and combinations of memory may be employed, such as random access memory (RAM), hard disk memory, removable medium memory, and so forth.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, such as the memory 108 as previously described. The features of the carousel view described herein are platform-independent, meaning that the instant messaging strategies may be implemented on a variety of commercial computing platforms having a variety of processors.

The processor 106 is illustrated as executing a carousel view (CV) module 110, which is also storable in memory 108. The CV module 110, when executed, processes a plurality of items to provide an output of one or more carousels 112, 114. Carousel 112 includes a plurality of bins 116-138. Likewise, carousel 114 includes a plurality of bins 140-148. Each of the bins 116-138, 140-148 is configured to represent items for display in a user interface 150. For example, each of the plurality of bins 116-138 of carousel 112 may represent a song from a playlist, a contact from a contact list, a folder, an address of a web page received from a search engine, and so on. For example, each of the plurality of bins 116-130, 134-138 of the first carousel 112 may represent a document, while each of the plurality of bins 132, 140-148 may represent a folder. Therefore, the user may open bin 132 to display the contents of the bin 132, such as the first carousel 114.

Like a physical carousel, the carousels 112, 114 of the user interface 150 may include a circular base or plinth. One such circular base 152 is illustrated for carousel 112. In another implementation, the circular base 152 is not displayed in the user interface 150 but rather implied when rendered for viewing by a user. The plurality of bins 116-138 is arranged around the circular base 152 to form the carousel 112. Likewise, the plurality of bins 140-148 are arranged to form carousel 114. Carousels 112, 114 are illustrated as sharing bin 132.

A user can rotate the plurality of bins 116-138 around the circular base 152 by using an input device 154 to access one or more particular items of interest. For example, the carousel 112 may store contact information for a plurality of contacts. When a user desires to locate contact information for a particular contact in a contact list, the user utilizes the input device 154 to rotate (e.g., spin) the carousel 112 until a bin having the desired contact information is displayed in "front" of the carousel 112. For instance, bin 116 of carousel 112 is illustrated as in front of the other bins 118-138 of the carousel 112.

The plurality of carousels 112, 114 may also be utilized to display hierarchical items, and therefore provide a hierarchical carousel view. For example, carousel 114 may include bins 132 and 140-148. The user can expand bin 132 into a new carousel (e.g., carousel 112) to display hierarchical data contained in the new carousel. Bin 132 is illustrated as larger than adjacent bins 130, 134 to indicate that bin 132 is shared by both carousels 112, 114 and is the bin which "connects" carousel 112 with carousel 114. Thus, the plurality of carousels 112, 114 provide a carousel view suitable for displaying a plurality of items, one or more relationships between the plurality of items, and relative numbers of items displayed in the carousels, further discussion of which may be found in relation to FIG. 2.

The CV module 110 may accept data from a variety of sources for providing the carousel view in the user interface 150. The CV module 110, for instance, is illustrated in the environment 100 of FIG. 1 as being included in an operating system 156. The operating system 156 is software (which may be provided by one or more modules) that controls the allocation and usage of hardware resources of the computing device 102, such as memory 108, processor 106, peripheral devices (e.g., the display device 104), and so on. The operating system 156 is foundation software on which programs, such as word processors, spreadsheets, browsers, and so on, may utilize to utilize the hardware resources. For instance, the computing device 102 may include a plurality of applications 158(n), where "n" can be any integer from one through "N", which are illustrated as stored in memory 108 and are executable on the processor 106. Each of the plurality of applications 158(n) is executable to provide a plurality of items for output in a carousel view. Therefore, the plurality of applications 158(n) may provide the plurality of items to the CV module 110, through the operating system 156, to cause the plurality of items to be rendered in the user interface 150 as one or more carousels. Thus, the CV module 110 may provide one or more application programming interfaces (APIs) which "hide" the details of generating the carousels 112, 114 from the applications 158(n).

In another implementation, the CV module 110 is implemented as part of the applications 158(n) themselves and is separate from the operating system 156. For example, application 158(n) may be configured to include an address book module that provides a carousel view for contacts in the address book. In a further implementation, the CV module 110 is a stand-alone module.

The CV module 110 may also receive data from over a network 160. For example, the computing device 102 may include a network connection device 162 for communicatively coupling the computing device 102 with another computing device 164, such as a web server, a remote computing device, and so on. Application 158(n), for instance, may be executable on the processor 106 to provide a web browser. The user may utilize the web browser to interact with a search engine which provides a plurality of items as a result of a web search. The application 158(n) may then provide the plurality of items to the CV module 110 for display in the user interface 150 as carousel 114. Each of the bins 132, 140-148 may include an address of a respective one of a plurality of web sites found as a result of the search. By expanding a bin (e.g., bin 132), carousel 112 is displayed in the user interface 150, which includes a plurality of bins 116-130, 134-138, each of which detailing a web page in the web site represented by bin 132. Although the network 160 is illustrated as the Internet, the network 160 may assume a wide variety of configurations. For example, the network 160 may include a wide area network (WAN), a local area network (LAN), a wireless network, a public telephone network, an intranet, and so on. Further, although a single network 160 is shown, the network 160 may be configured to include multiple networks.

By employing a carousel view, the user interface 150 provides a variety of additional functionality that was not available using traditional viewing techniques. For example, the carousels 112, 114 may be utilized to depict a number of items included in a collection, even if all of the items are not displayable at any one time on the user interface 150. For example, a situation may be encountered in which the number of items in a result cannot be rendered at any one time on the display device 104. When using a traditional list view or tree view in such an instance, the user is not able to determine the number of items in the list because each of the items in the list is not displayable at any one time. In both cases, the user is forced to navigate through the display of the items, such as by using a scroll bar, to get a rough determination of the number of items in the result. Thus, when confronted with a large number of items, the user may be unable to estimate the number of items in the result, even to within an order of magnitude utilizing traditional viewing techniques.

The carousel view, however, may indicate a number of items in a result by varying a radius of a carousel. For example, carousel 112 is illustrated as including twelve bins 116-138 and carousel 114 is illustrated as including five bins 140-148 (and shares bin 132). Because carousel 112 has a greater number of bins than carousel 114, carousel 112 is rendered as having a larger radius than carousel 114. Therefore, a user viewing both carousels 112, 114 may readily determine based on the radius of each respective carousel 112, 114 which of the carousels 112, 114 represents a larger number of items.

Varying the radius may also be utilized to indicate a number of items even if all the items are not concurrently displayable in the user interface 150. For example, the CV module 110 may display a portion of a set which is legible to a user when viewing the user interface 150. Any portion of the set which cannot be displayed at that time may be represented in a variety of ways.

Figure 2:
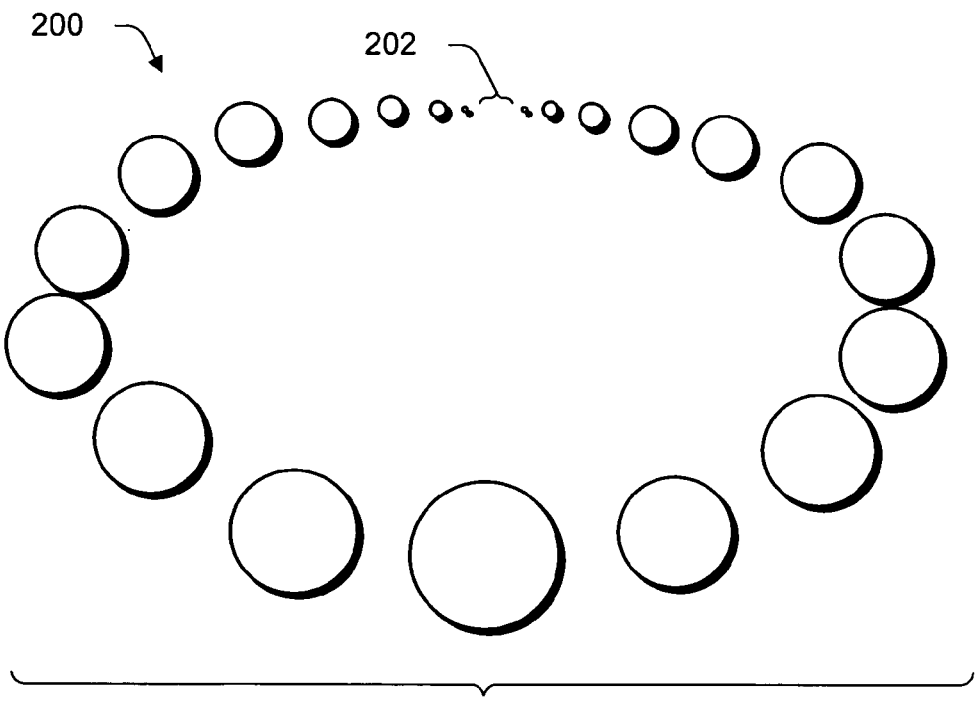
FIG. 2 is an illustration of an exemplary implementation showing a carousel having a clipping area for representing items which are not concurrently displayable in the carousel.

FIG. 2, for example, illustrates bins in a carousel 200 which are displayed such that they appear to fade from view by being displayed progressively smaller until they fade into a "clipping area" 202. In another example shown in FIG. 3, the clipping area 302 may be displayed as a "gray" area (illustrated in FIG. 3 through use of cross-hatching) in a carousel 300. Therefore, even though the user is not able to view each item represented by the carousels 200, 300 of respective FIGS. 2 and 3, the user may determine a relative number of items each carousel based on the radius of the respective carousel. Further discussion of computation of a radius for a carousel may be found in relation to FIG. 7.

Figure 4:
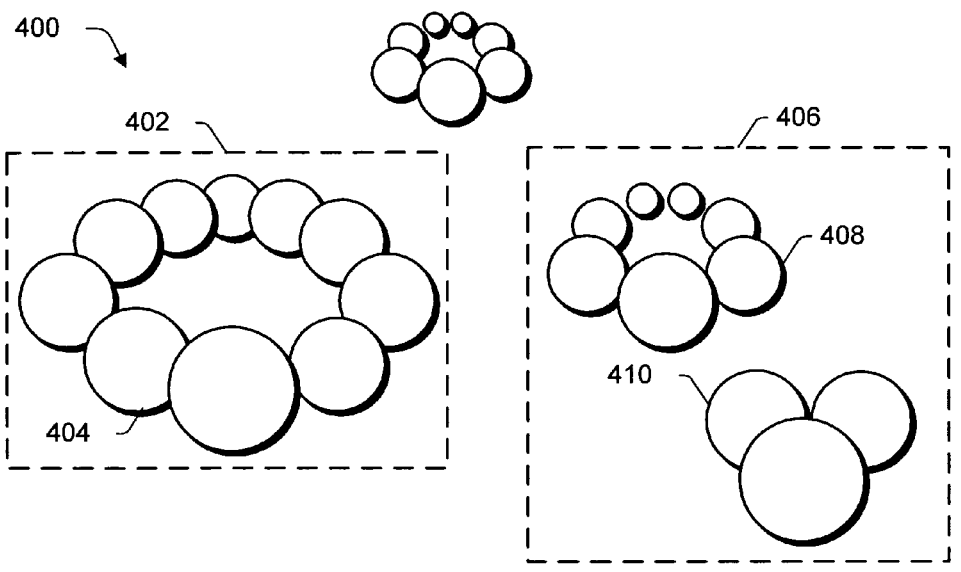
FIG. 4 is an illustration of an exemplary implementation showing a carousel view having a plurality of carousels which are arranged to depict relationships between items represented by the carousels.

The carousel view also provides for an ability to represent relationships between items in one or more carousels. For example, the carousel view may enable a user to see a global shape of a collection of items. A user, for instance, may wish to compare different parts of an organizational chart 400 shown in FIG. 4, in which each circular bin of the organizational chart 400 represents a person in a company. A first part 402 of the organization chart is flat in that it includes a single hierarchical level, which is illustrated in FIG. 4 as a single carousel 404. A second part 406 of the organizational chart 400, however, may include multitude hierarchical levels, illustrated as carousels 408, 410, which illustrate multiple levels of management. Thus, the carousel view may depict such organization through arrangement of multiple carousels 404, 408, 410, each of which reflecting the number of items in that particular hierarchical level. When a user views the carousels 404, 408, 410 in the carousel view, a sense of this global structure is provided which is difficult to obtain in a list view or tree view. In a tree view, for instance, a large number of items in the levels may not be displayed, which required the user to scroll through the view to obtain the relevant information, and then perform mental calculations to determine the number of hierarchies in the tree as well as the number of items at each level in the tree. By utilizing the carousel view, however, the user can readily compare different parts of the result set and/or see the global shape of the result set. For instance, even though the first and second parts 402, 406 of the organization chart 400 of FIG. 4 include the same number of items (which are represented by corresponding circular bins), the carousel view utilizing the carousels 404, 408, 410 illustrates the relationships of those items through arrangement of the carousels.

Figure 5:
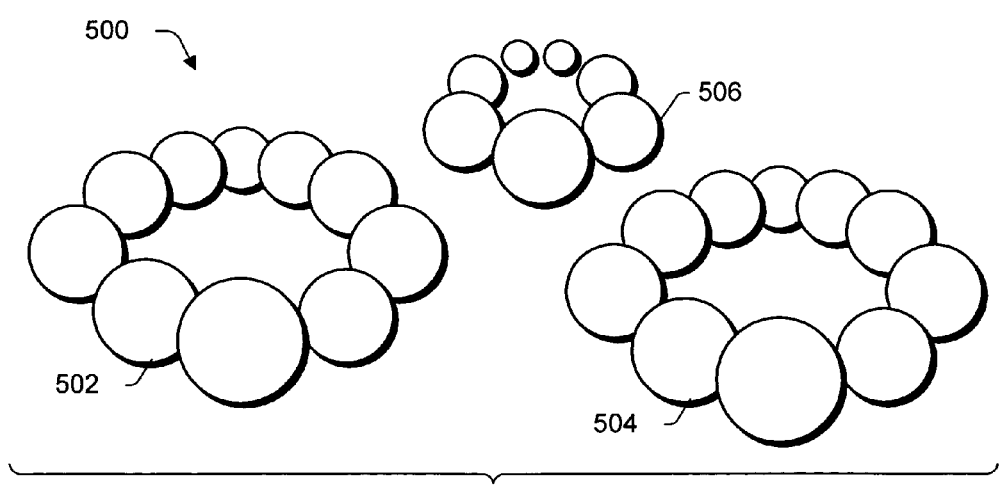
FIG. 5 is an illustration of an exemplary implementation showing a carousel view having a plurality of carousels, each representing a respective cluster.

Additionally, the carousel view may depict non-hierarchical relationships which could not be shown utilizing traditional viewing techniques. One such instance is clusters, an example of which is shown in FIG. 5. A cluster includes discreet sets of items in which one set is generally unrelated to another set. For instance, a search result 500 for a keyword search for documents on a computing device may include different types of documents. The carousel view may be utilized to depict the items in the search result 500 based on type, such as a first carousel 502 for a cluster of word processing documents, a second carousel 504 for a cluster of pictures, and a third carousel 506 for a cluster of MP3 files. In this example, the user, when viewing the search result 500, is able to determine that equal numbers of word processing documents and pictures are included in the result by viewing the respective first and second carousels 502, 504. The user is also able to determine that the search result 500 has a relatively fewer number of MP3 files by viewing the third carousel 506 (and more particularly the radius of the third carousel 506), when compared to the first and second carousels 502, 504.

Figure 6:
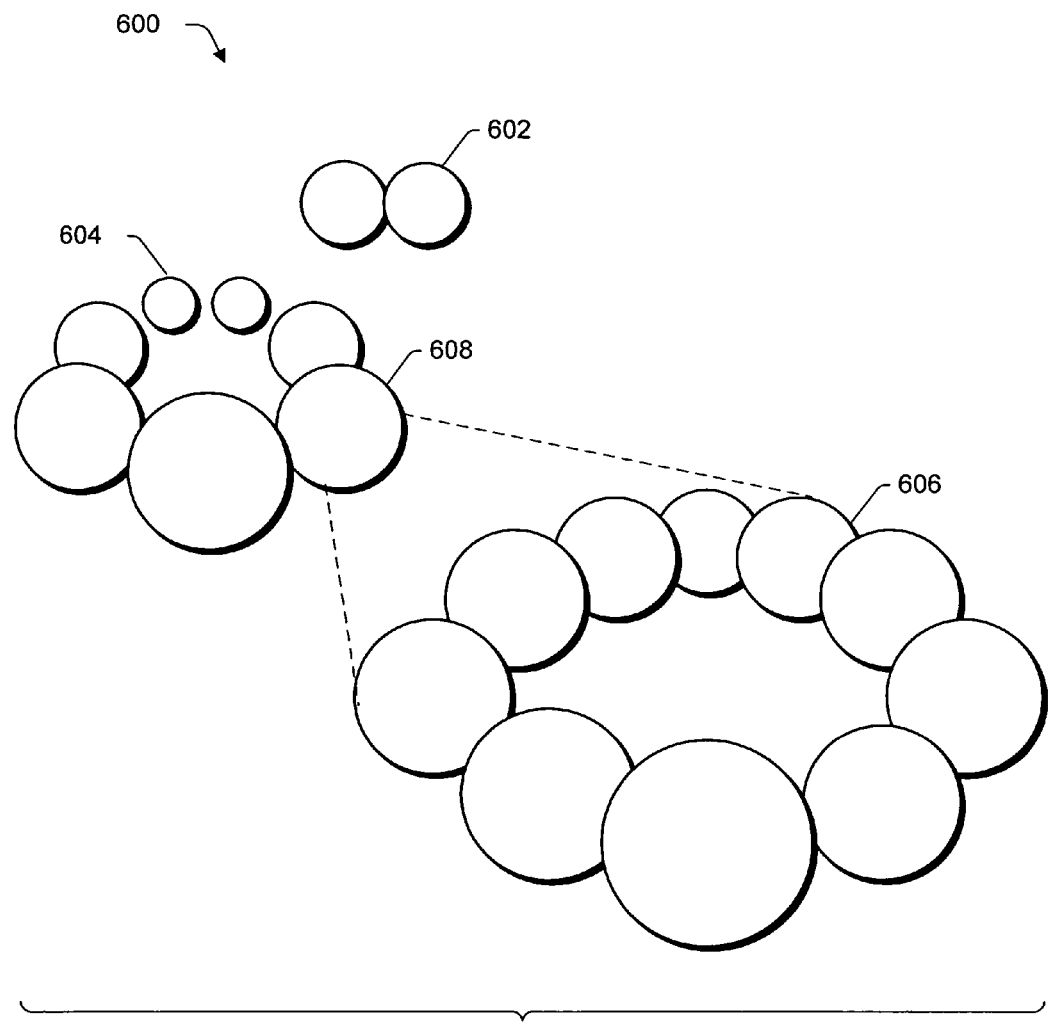
FIG. 6 is an illustration of an exemplary implementation showing a carousel view of a family tree that includes hierarchical levels of descendants arranged in corresponding carousels.

Graphs, which may be considered as arbitrary n-way connections of nodes (i.e., items), may also be represented utilizing a carousel view, an example of which is illustrated in FIG. 6. FIG. 6 is an illustration of an exemplary implementation of a family tree 600 that includes hierarchical levels of descendants arranged in corresponding carousels 602, 604, 606. Each of the carousels 602, 604, 606 illustrates relative numbers of items (e.g., families and family members) in the respective carousels 602-606 through use of the respective radii of each of the carousels 602-606 as previously described.

Additionally, a bin 608 in carousel 604 may represent a particular family that, when selected, is expanded to show members of that family in carousel 606. Thus, the bin provides the ability to refer to subgroups (e.g., a family) as an entity distinct from the items in the sub-group (e.g., members of the family). Further discussion of navigation between carousels may be found in the Carousel Navigation section.

Generating a Carousel

The CV module 110 may be executed by a computing device 102 to generate one or more carousels in a variety of ways. The following sections describe examples of generating a carousel to have properties which enable a user to compare the carousel with other carousels in a carousel view.

Computing a Carousel Radius

Figure 7:
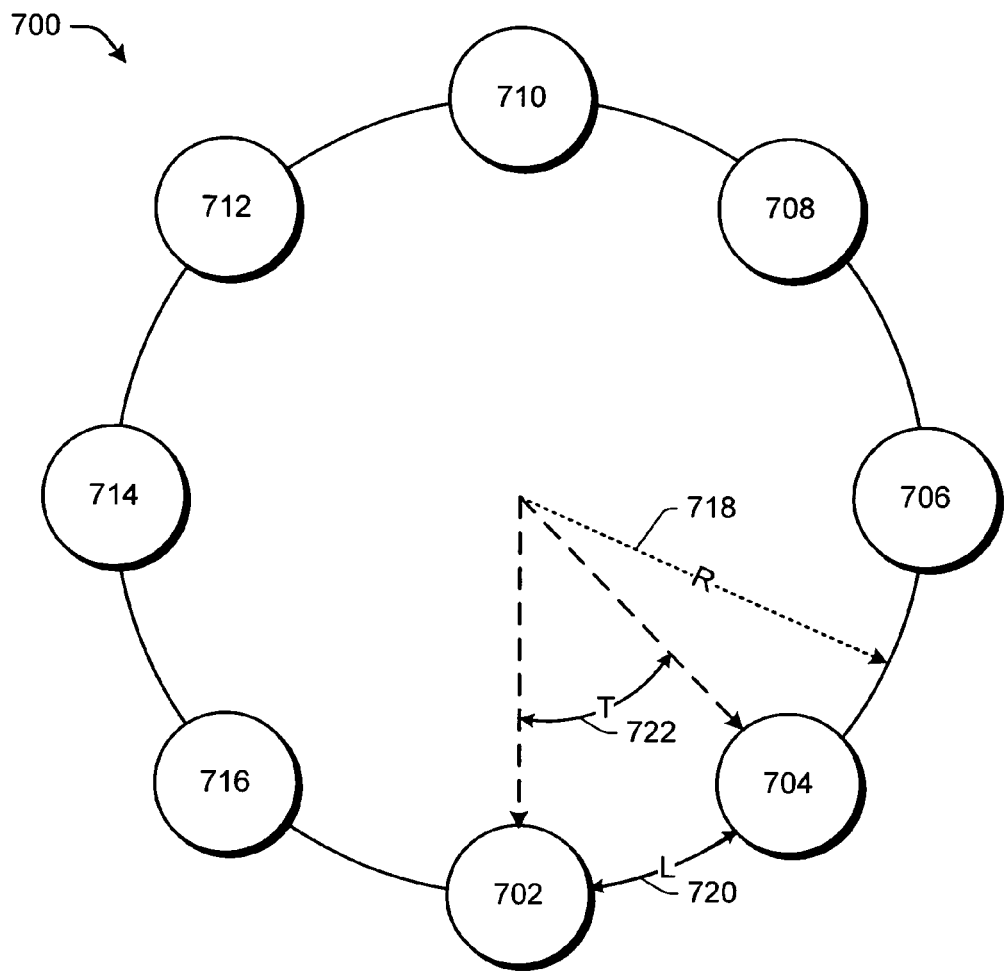
FIG. 7 is an illustration of an exemplary implementation showing a carousel having a radius this is computed based on a number of items represented by the carousel.

FIG. 7 is an illustration of an exemplary implementation showing a carousel 700 having a radius this is computed based on a number of items represented by the carousel 700. The carousel 700 is illustrated as including a plurality of bins 702-716 which are arranged in accordance with a radius 718. The radius 718 may be configured to increase as the number of bins 702-716 in the carousel 700 increases so that a user may readily determine the number of items in a list represented by the carousel 700. The radius 718 of the carousel 700 may be computed in a variety of ways. For example, an equation for the radius 718 of carousel 700 may be represented as follows:

$$R = a\sqrt{N} + b \text{ (hereinafter, ``radius equation'')}.$$

"N" is the number of bins in the carousel 700. Additionally, "a" and "b" are constant values which may be determined by a graphic artist. The radius equation is configured to ensure that the carousel 700 has a larger radius as more items are added to the carousel 700, and yet this "growth" is progressively limited by a square root function to address large sets of items. For example, a graphic artist may set "a" equal to sixteen and "b" equal to thirty-two. Using pixels as a unit a measure in the radius equation, a carousel with one item is approximately 96 pixels wide, with ten items is approximately 165 pixels wide, with one hundred items is approximately 384 pixels wide, with one-thousand items is approximately 1175 pixels wide, and so on. In this way, the carousel is able to represent differences in relatively small numbers (e.g., less than twelve) of items, yet is also able to represent very large numbers (e.g., greater than 100) of items.

The bins 702-716 are arranged around the outside circumference of the carousel 700. To arrange the bins 702-716, each bin is allocated to occupy a certain arc of the circumference. An ideal length of this arc may be calculated depending on the representation being utilized for each of the bins. For example, if a large and/or detailed bin representation (e.g., having a large number of pixels) is utilized to represent the bins 702-716 in the carousel 700, an ideal length of the arc may be set such that the bins in "the front" of the carousel 700 are displayed as desired by the graphical artist. For example, an ideal arc length "L" 720 may be defined. For a carousel 700 of radius "R" 718, the ideal arc length "L" 720 corresponds to an angle "T" 722 of the carousel 700. "T" may be computed in a variety of ways, an example of which is given by the following equation:

$$T = 360\left(\frac{L}{2\pi R}\right)$$ (hereinafter, "ideal angle equation").

In some instances, there may not be an exact match between the number of bins in a carousel and the amount of space available for the carousel. In other words, "T" multiplied by "N" may not equal 360 degrees. To address these instances, bins in the carousel may be arranged in a variety of ways, examples of which are discussed in the following figures.

Spacing Bins in a Carousel

Figure 8:
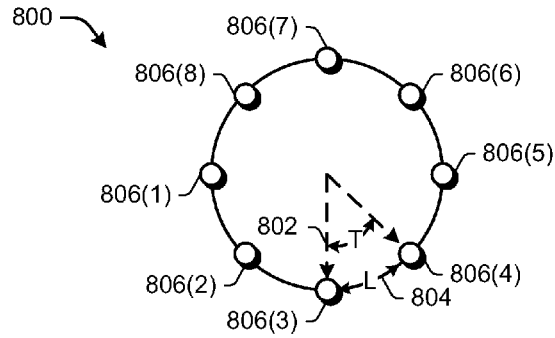
FIG. 8 is an illustration of an exemplary implementation showing computation of an ideal arc length for spacing of a plurality of bins in a carousel.

FIG. 8 is an illustration of an exemplary implementation of a carousel 800 in which an angle "T" 802 resulting in an ideal arc length "L" 804 for spacing of a plurality of bins 806(1)-806(8) in the carousel 800 multiplied by a number of bins in the carousel is less than 360 degrees. The carousel 800 of FIG. 8 is an example of an instance in which a number of bins is encountered such that "T" 802 multiplied by "N" is less than 360 degrees. In this example, the angle between the plurality of bins 806(1)-806(8) is equal to angle "T" 802, with extra space, if any, left between the first and last bins 806(1), 806(8). For instance, the extra space may be provided between bins 806(6)-806(8) which are in the "background" of the carousel 800.

Figure 9:
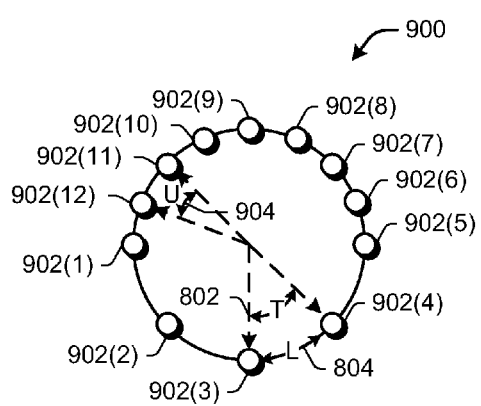
FIG. 9 is an illustration of an exemplary implementation showing a carousel having a first collection of bins which employ spacing, one to another, that is different than spacing employed by a second collection of bins.

FIG. 9 is an illustration of an exemplary implementation of a carousel 900 in which the angle "T" 802 resulting in an ideal arc length "L" 804 for spacing of a plurality of bins 902(1)-902(12) in the carousel 900 multiplied by a number of bins in the carousel 900 is greater than 360 degrees. In other words, the carousel 900 of FIG. 9 is an example of an instance in which a number of bins is encountered such that "T" 802 multiplied by "N" is greater than 360 degrees. In this instance, two different angles are utilized to space the bins 902(1)-902(12). Bins 902(1)-902(5) in the front of the carousel 900 are spaced at angle "T" 802, while bins 902(6)-902(12) at the "back" of the carousel 900 are spaced according to an angle "U" 904. Angle "U" may be computed in a variety of ways, an example of which is shown in the following equation:

$$U = \frac{180}{N - \left\lfloor \frac{180}{T} \right\rfloor}.$$

As shown in FIG. 9, the angle "U" 904 is less than angle "T" 802 such that the bins 902(6)-902(12) in the "back" of the carousel 900 are spaced closer, one to another, than the spacing used for the bins 902(1)-902(5) in the "front" of the carousel 900. Thus, the carousel 900 of FIG. 9 has a first portion of the bins arranged according to a first angle (e.g., angle "T" 802) and a second portion of the bins arranged according to a second angle (e.g., angle "U" 904).

Figure 10:
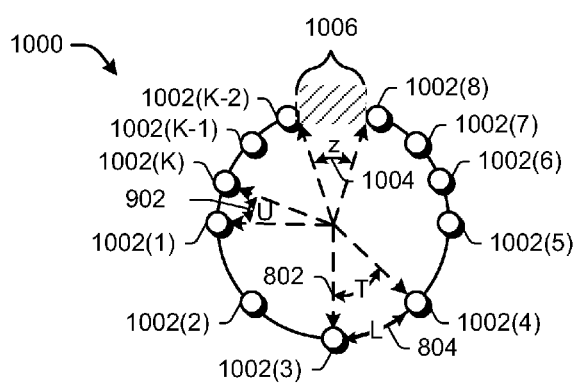
FIG. 10 is an illustration of an exemplary implementation of a carousel having a number of bins such that the bins of the carousel are not concurrently displayable.

FIG. 10 is an illustration of an exemplary implementation of a carousel 1000 having a number of bins 1002(1)-1002(K) such that each of the bins 1002(1)-1002(K) is not displayable in the carousel 1000 at any one time. Like the carousel 900 of FIG. 9, the angle "T" 802 resulting in an ideal arc length "L" 804 for spacing of the plurality of bins 1002(1)-1002(K) in the carousel 1000 multiplied by a number of bins in the carousel 1000 is greater than 360 degrees. In this example, however, "N" is such that the plurality of bins 1002(1)-1002(K) cannot be concurrently displayed as desired. For example, a graphical artist may create a representation for each the bins 1002(1)-1002(K). The representation may employ a number of pixels such that the "N" bins are not concurrently renderable as desired by the graphical artist.

Figure 3:
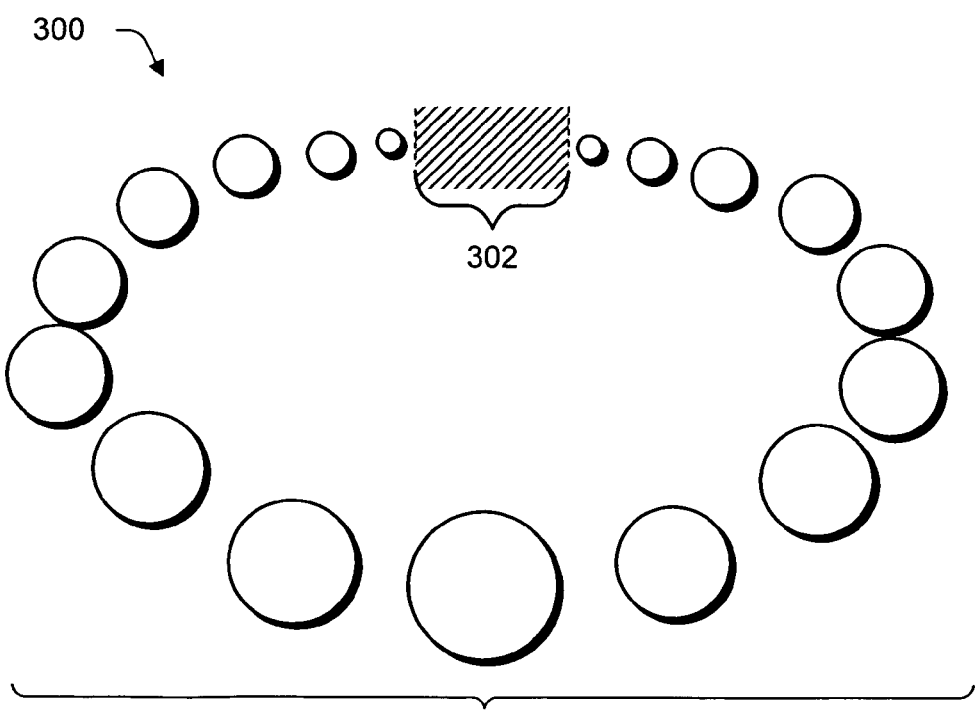
FIG. 3 is an illustration of an additional exemplary implementation showing a carousel having a clipping area depicted as a "gray" area.

In this instance, an angle "Z" 1004 is defined for a "clipping area" 1006, which is similar to the clipping area 302 described in relation to FIG. 3. The clipping area 1006 defines a portion of the carousel 1000 which represents items which are not concurrently renderable with items represented by the plurality of bins of the carousel 1000. As previously described, the clipping area may represent these items in a variety of ways, such as a blank area of FIG. 2, a gray area 302 of FIG. 3, a cloud, a tunnel, and so forth. As the carousel 1000 is rotated, bins of the carousel 1000 will be displayed as "entering" and "leaving" the clipping area 1006. Therefore, the carousel 1000 may be utilized to display a large number of bins with many of the bins (i.e., bins corresponding to items which are not concurrently renderable in the user interface) "hidden" in the clipping area 1006. The carousel 1000 is thus similar to a list view in which items in a list are scrolled off the screen. However, because the size of the carousel 1000 reflects the total number of bins 1002(1)-1002(K) (i.e., items in the list), the user is provided with an indication of the number of items represented by the carousel 1000. For instance, while a list of 1000 items may appear similar to a list of 10,000 items in that both carousels display the same number of bins at any one time, a carousel having 10,000 items may be visibly larger than a carousel having 1000 items by having a larger radius than the radius of the carousel having 1000 items. To space the bins 1002(6)-1002(8), 1002(k-2), 1002(k-1), 1002(k) displayed in the "back" of the carousel 1000, the carousel 1000 may include angle "U" 904 as previously described in relation to FIG. 9.

Carousel Navigation

There are several ways of navigating between carousels (e.g., expanding bins, open/closing carousels, and so on) and within a carousel (e.g., spinning). Examples of each of these navigation techniques are described in greater detail in the following sections.

Navigating Between Carousels

A carousel hierarchy can be navigated by opening and closing carousels and expanding and contracting bins. As discussed earlier in relation to FIG. 1, a bin may be expanded to create another carousel having additional data. For example, a carousel may be generated in which each bin represents a person that has contributed to a project. One of the bins (i.e., a representation of the "person") may be expanded to show direct reports created by that person, which are arranged as a plurality of bins in another carousel. The user may then select one of the direct reports to show other reports cited in that report, and so on. Carousels can also be opened or closed. When a carousel is closed, only those bins that are expanded are shown.

Figure 11:
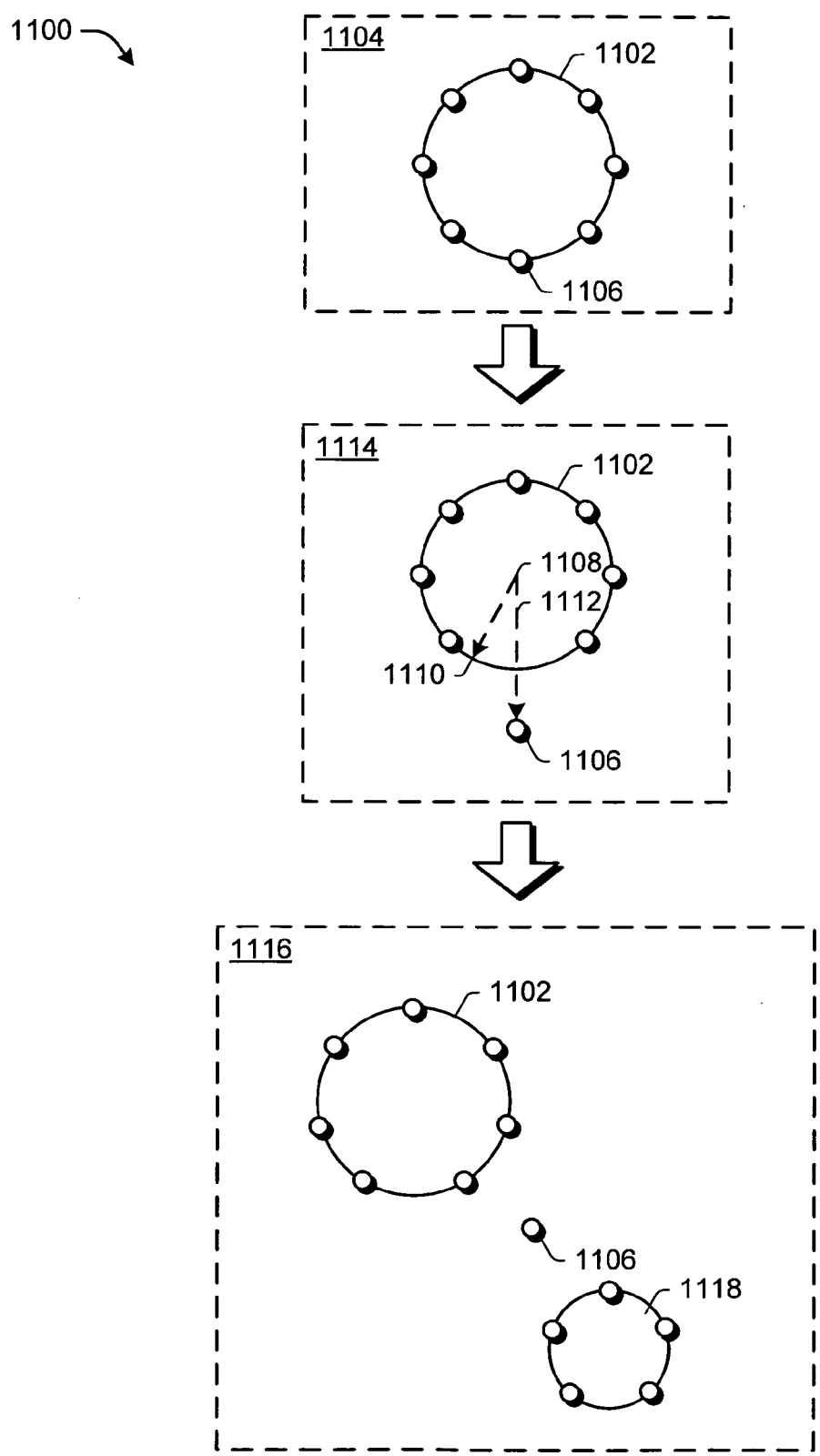
FIG. 11 is an illustration of an exemplary implementation showing expansion of a bin in a carousel to form an additional carousel.

FIG. 11 is an illustration of an exemplary implementation 1100 in which a bin of a carousel 1102 is expanded to form an additional carousel. As previously described, a carousel view may be utilized to show relationships of items in a result. The carousel view allows the user to expand a bin to show additional information about the bin. For example, a collection of file folders may be represented as a plurality of bins of an original carousel 1102, an example of which is shown at block 1104.

A user may select bin 1106 to expand a folder to show items in that folder. The bin 1106 to be expanded is moved away from the center 1108 of the original carousel 1102, such as from a distance of "R" 1110 to a distance of "$R_1$" 1112 as shown at block 1114. The ratio of "R" 1110 to "$R_1$" 1112 can be computed in a variety of ways, an example of which is shown by the following equation, where "d" and "e" are constants and "d" is greater than or equal to one:

$$R_1 = dR + e$$

At block 1116, these new items of bin 1106 are shown in a new carousel 1118, which is located tangentially to the original carousel 1102. Additionally, the remaining bins of the original carousel 1102 may be readjusted to fill in the vacated space originally taken by bin 1106. Although expansion of the bin 1106 to form a new carousel has been discussed, contraction of the new carousel 1118 may also be performed in a similar manner such that the bin 1106 of block 1116 is returned to form the original carousel 1102 of block 1104.

Figure 12:
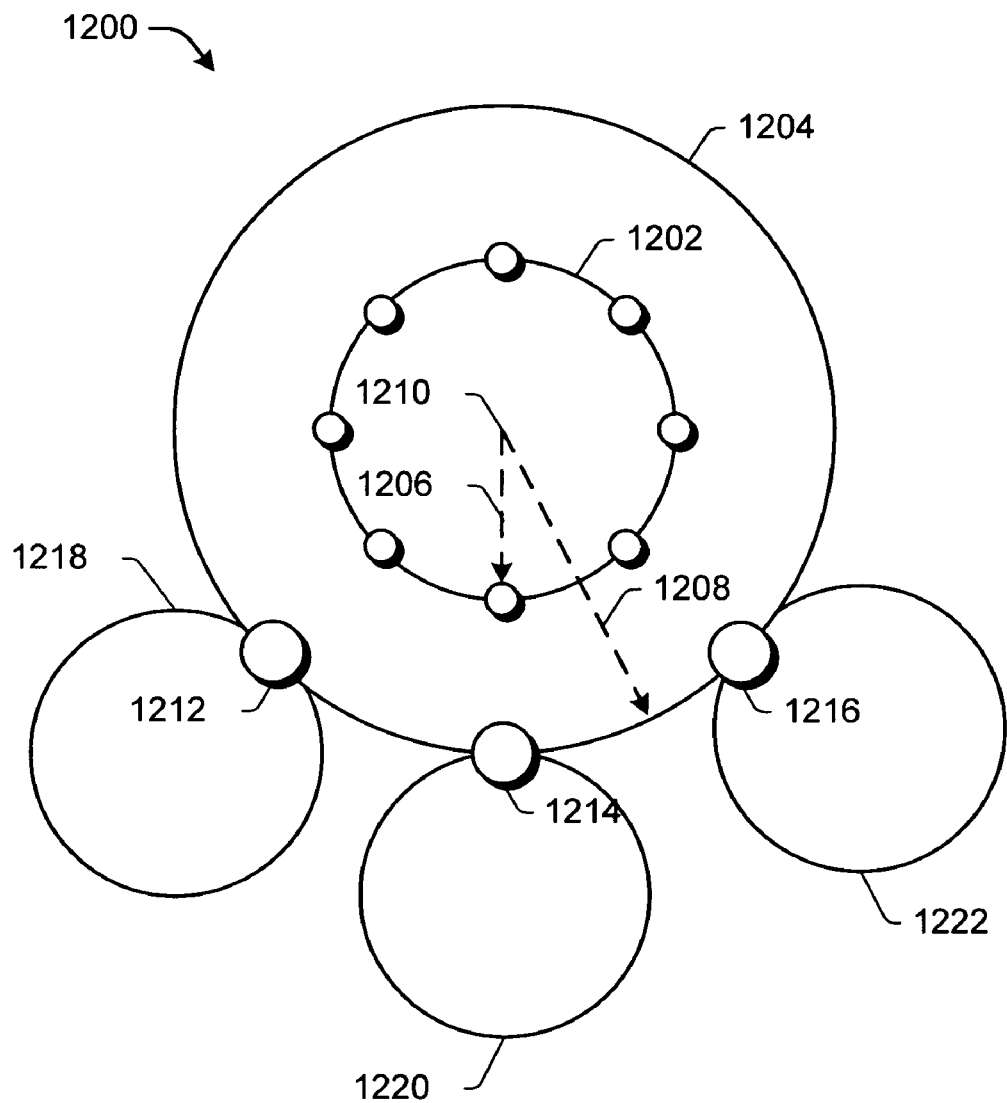
FIG. 12 is an illustration of an exemplary implementation showing expansion of a plurality of bins that are included in a carousel.

FIG. 12 is an illustration of an exemplary implementation in which a plurality of bins in a carousel 1200 is expanded. Although expansion of a single bin to form a new carousel 1118 was shown in FIG. 11, multiple bins may also be expanded at the same time to form a carousel 1200 having concentric rings. For example, a carousel 1200 may include an inner ring 1202 and an outer ring 1204. Bins in the inner ring 1202 are located at a radius "R" 1206. Bins resulting from an expansion of bins in the inner ring 1202 are located at radius "$R_1$" 1208 from the center 1210 of the inner ring 1202. Thus, in this instance the carousel 1200 includes bins arranged in two concentric rings, with each successive expansion of a bin in one of the rings resulting in inclusion of one or more items placed in a concentric ring that is located further from the center 1210 of the carousel 1200 than the bin from which it was expanded.

The bins of the inner ring 1202 may be arranged as previously described in relation to FIGS. 7-10. In an implementation, bins 1212-1216 in the outer ring 1204 are subject to different arrangement rules than the bins of the inner ring 1202. For example, each of the bins 1212, 1214, 1216 in the outer ring 1204 may have a corresponding child carousel 1218, 1220, 1222 which is tangentially positioned adjacent to the respective bins 1212, 1214, 1216.

The bins 1212-1216 of the outer ring 1204 may be "locked" such that the corresponding child carousels 1218, 1220, 1222 do not overlap. For instance, bins 1212-1216 may be displayed such that the user may still spin the bins of the inner ring 1202 without affecting the bins 1212-1216 of the outer ring 1204. Thus, placement of the bins 12-16 and the corresponding carousels 1218-1222 may be preserved yet still enable the user to navigate through other bins in the inner ring 1202.

The carousels 1218-1222 may be arranged in a variety of ways. For example, the CV module 110 of FIG. 1 may be executed to automatically arrange the bins 1212-1216 to prevent the carousels 1218-1222 from overlapping. In another example, the user may move bins on the outer ring 1204 manually through use of the input device 154 of FIG. 1.

Opening and Closing a Carousel

To optimize the amount of information on rendered on a display device at any one time, the carousel view may support the "opening" and "closing" of carousels. For instance, when a plurality of carousels are concurrently rendered on a display device, such as when exploring an organizational chart, a situation may be encountered in which additional carousels cannot be displayed unless one or more of the currently rendered carousels are closed, an example of which is described in relation to the following figure.

Figure 13:
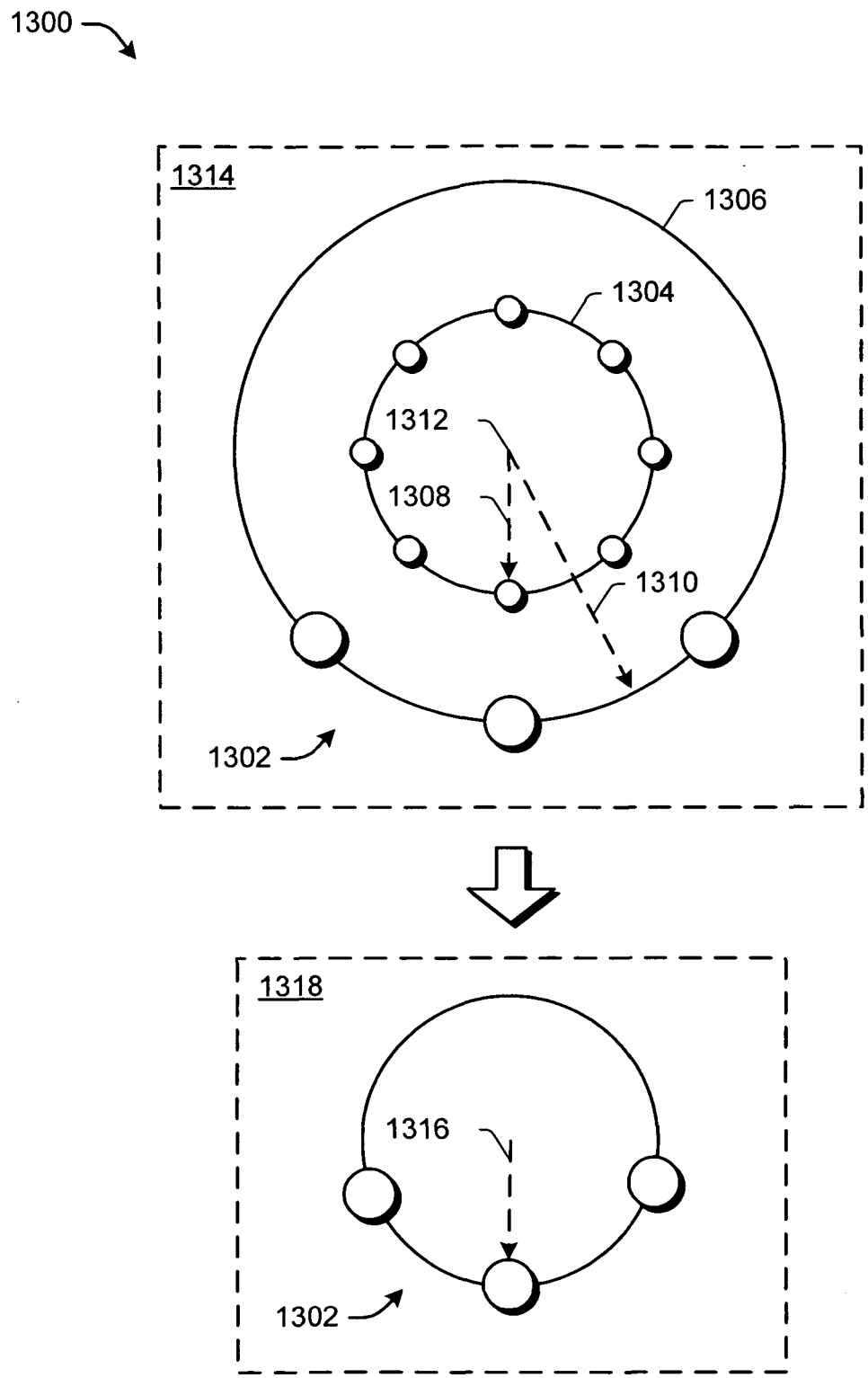
FIG. 13 is an illustration of an exemplary implementation in which a carousel having an inner ring and an outer ring is closed such that only the outer ring is displayed.

FIG. 13 is an illustration of an exemplary implementation 1300 in which a carousel 1302 having an inner ring 1304 and an outer ring 1306 is closed such that the outer ring 1306 is displayed without the inner ring 1304. Like FIG. 12, bins in the inner ring 1304 are located at a radius "R" 1308. Bins resulting from an expansion of bins in the inner ring 1304 are located at radius "$R_1$" 1310 from the center 1312 of the inner ring 1304. Thus, at block 1314, a user is provided with a view of bins of a carousel 1302 that are arranged on both the inner and outer rings 1304, 1306.

To close the inner ring 1304 such that only the outer ring 1306 is displayed (such as in response to an input received from a user utilizing an input device), the radius of the carousel 1302 is reduced to "$R_2$" 1316, where "$R_2$" 1316 is equal to "$R_1$" 1310 minus "R" 1308. Thus, as shown at block 1318, just the outer ring 1306 is displayed at the new radius "$R_2$" 1316 with the bins of the inner ring 1304 being hidden from view.

Because the size of "R" 1308 depends on the number of items in the carousel 1302, even in the closed state of block 1318, the size of a carousel 1302 still represents the number of items in the carousel 1302. In an implementation, in addition to hiding the bins of the inner ring 1304, the carousel 1302 may provide additional visual feedback that the carousel 1302 is in a closed state, such as by a change of color.

Figure 14:
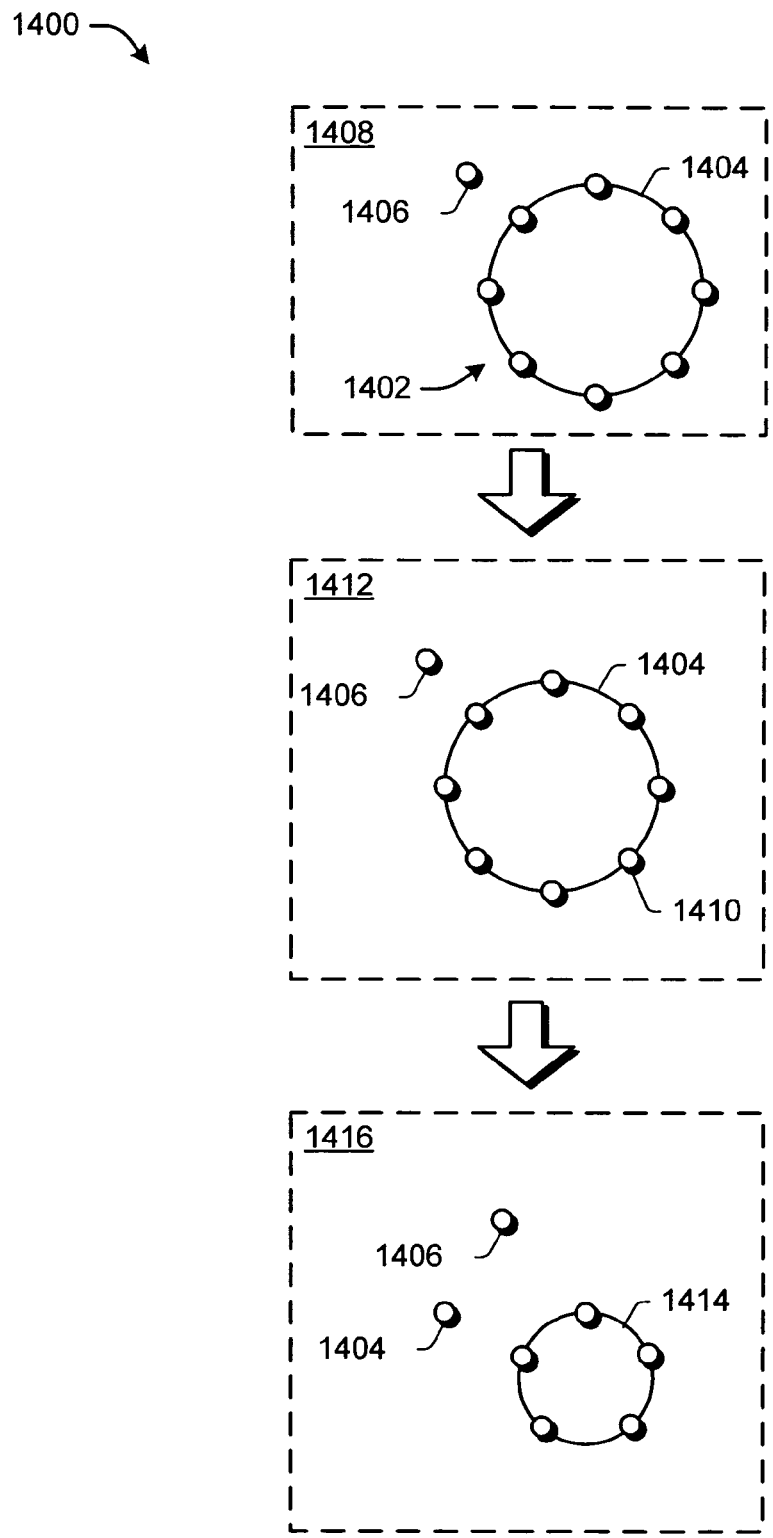
FIG. 14 is an illustration of an exemplary implementation in which navigation of a carousel hierarchy is shown.

FIG. 14 is an illustration of an exemplary implementation 1400 in which navigation of a carousel hierarchy is shown. Navigating a carousel hierarchy may involve a combination of expansion/contraction of carousels as described in FIG. 13 and opening/closing of bins as described in FIG. 11. To optimize the user interface, the CV module 110 of FIG. 1 may be executed to automatically arrange the carousels as a user navigates through the carousel hierarchy.

For example, a carousel hierarchy 1402 may include a first carousel 1404 and a second carousel 1406 (block 1408). The first carousel 1404 may be a "child" of the second carousel 1406, which is displayed in a closed state to conserve space in a user interface.

A user may then select a bin 1410 of the first carousel 1404 for expansion (block 1412). When the bin 1410 is expanded, that bin's carousel (i.e., the first carousel 1404) is closed before a new carousel 1414 is rendered (block 1416). The closed first and second carousels (i.e., the first and second carousels 1404, 1406 of block 1412) are also automatically rearranged through execution of the CV module 110 of FIG. 1 to conserve space in the user interface. Although automatic closing of carousels through execution of the CV module 110 of FIG. 1 has been described, a variety of other implementations for navigating a carousel hierarchy are also contemplated, such as through manual closing and rearranging of carousels.

Navigating within a Carousel

In the previous implementations, navigation between carousels was described. Navigation may also be performed within a carousel to locate a particular bin, which may also be referred to as "spinning" a carousel. Spinning, for instance, may refer to a process of rotating bins in a carousel to bring a different corresponding item represented by a bin to the "front" of a user interface. Spinning may be provided for a variety of reasons. For example, bins located at the "back" of the carousel might not be visible. A bin, for instance, may be located behind another bin in the carousel, such as bin 122 located behind bin 120 of FIG. 1. In another instance, a bin may be included in the "clipping area" 302 of the carousel 300 as shown in FIG. 3.

Figure 15:
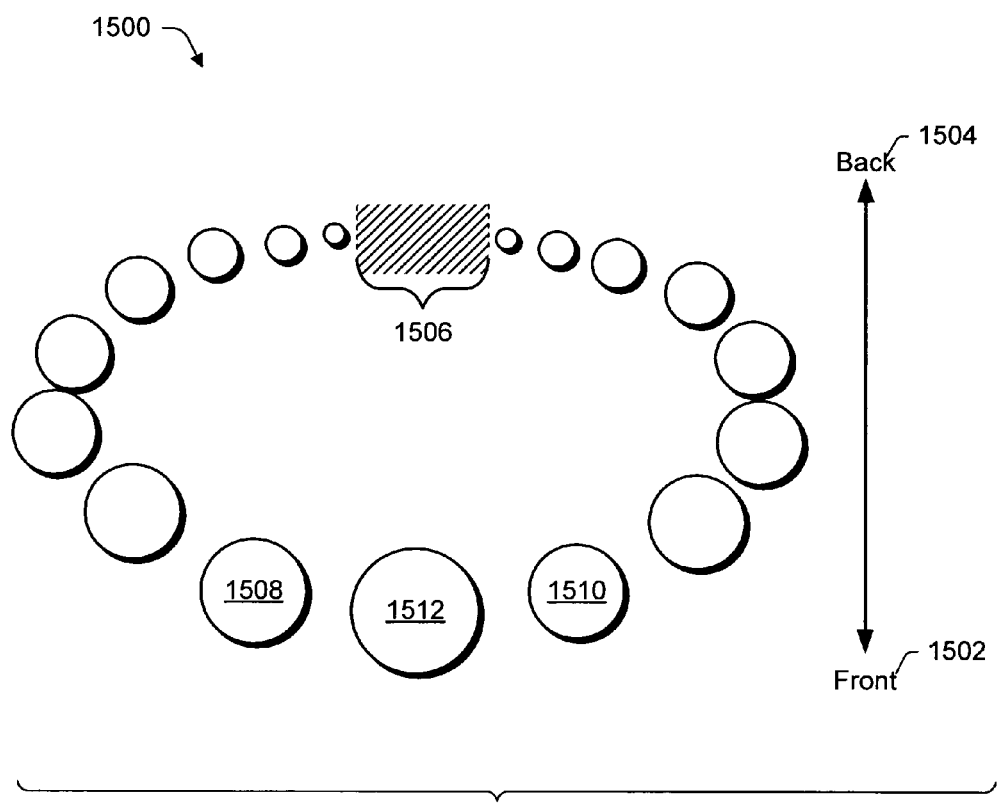
FIG. 15 is an illustration of a carousel in an exemplary implementation for showing navigation within the carousel.

In another example illustrated in the exemplary carousel 1500 of FIG. 15, bins located in the "front" 1502 of the carousel 1500 occupy more screen space than bins located in the "back" 1504 of the carousel 1500 due to a three dimensional nature of the carousel 1500. Therefore, to view the bins in the "back" 1504 of the carousel 1500, the user may cause the carousel 1500 to spin such that the bins are then relocated in the "front" 1502. The carousel 1500 supports a variety of spinning techniques, examples of which are described in the following sections.

Item Spin

By selecting a bin (for example, with a mouse click), the carousel 1500 will rotate to place that bin in the front. Depending on which bin is selected, the item spin can cause the carousel to rotate differing amounts and/or directions. In an implementation, selecting a bin on the right side of the carousel 1500 will cause the carousel 1500 to spin clockwise, while selecting a bin on the left side will cause the carousel 1500 to spin counter-clockwise. In an implementation, because bins located in the front 1502 of the carousel 1500 may be evenly spaced (e.g., by angle "T" 802 of FIG. 8), the user can keep their mouse positioned in one location to continuously "click-spin" through all of the bins in the carousel 1500. In another implementation, selection of the clipping area 1506 causes bins in the clipping area 1506 to be displayed. In a further implementation, selection of the clipping area 1506 has no effect.

Step Spin

A user can also spin the carousel 1500 one bin at a time, clockwise or counter-clockwise. This is known as a step spin, and in an implementation can be triggered by a mouse wheel and/or the left/right arrow keys. The step spin may be equivalent to performing an item spin on the bins 1508, 1510 immediately adjacent to the front-most bin 1512.

Page Spin

A page spin refers to a spin of the carousel 1500 by however many bins that occupy ninety degrees of the front arc. For instance, as previously described in relation to FIGS. 8-10, the actual number of bins involved in a page spin may depend on a total number of bins displayed by the carousel 1500. The page spin may be implemented in a variety of ways, such as by using page-up and/or page-down keys. The page spin may be equivalent to doing an item spin on bins located at the three o'clock or nine o'clock positions of the carousel 1500.

Drag Spin

A front drag spin may be initiated by holding down a mouse button on a bin on the front 1502 of the carousel 1500. The user can spin the carousel 1500 by dragging the mouse clockwise or counter-clockwise, which will cause the carousel 1500 to rotate. The amount of rotation "θ", for instance, may correspond to the radius of the carousel 1500 and the distance "d" the mouse has moved, and may be computed using the following equation:

$$\theta = 360\left(\frac{d}{2\pi R}\right).$$

A back drag spin may be performed in a similar manner by dragging a bin located at the back 1504 of the carousel 1500.

Free Spin

The carousel 1500 can also be made to "free spin", such as by spinning the carousel 1500 continuously clockwise or counterclockwise. In an implementation, the free spin is initiated by holding down a mouse button in the clipping area 1506, and then dragging the mouse to the left or right to free spin the carousel 1500 counter-clockwise or clockwise, respectively. The further the mouse is dragged from the center of the clipping area 1506, the faster the carousel 1500 will free spin. The rotation rate may be made relative to the circumference of the carousel 1500, so that a larger carousel will take a greater amount of time to make a complete rotation than a smaller carousel.

Exemplary Procedures

The following discussion describes a carousel view that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 16:
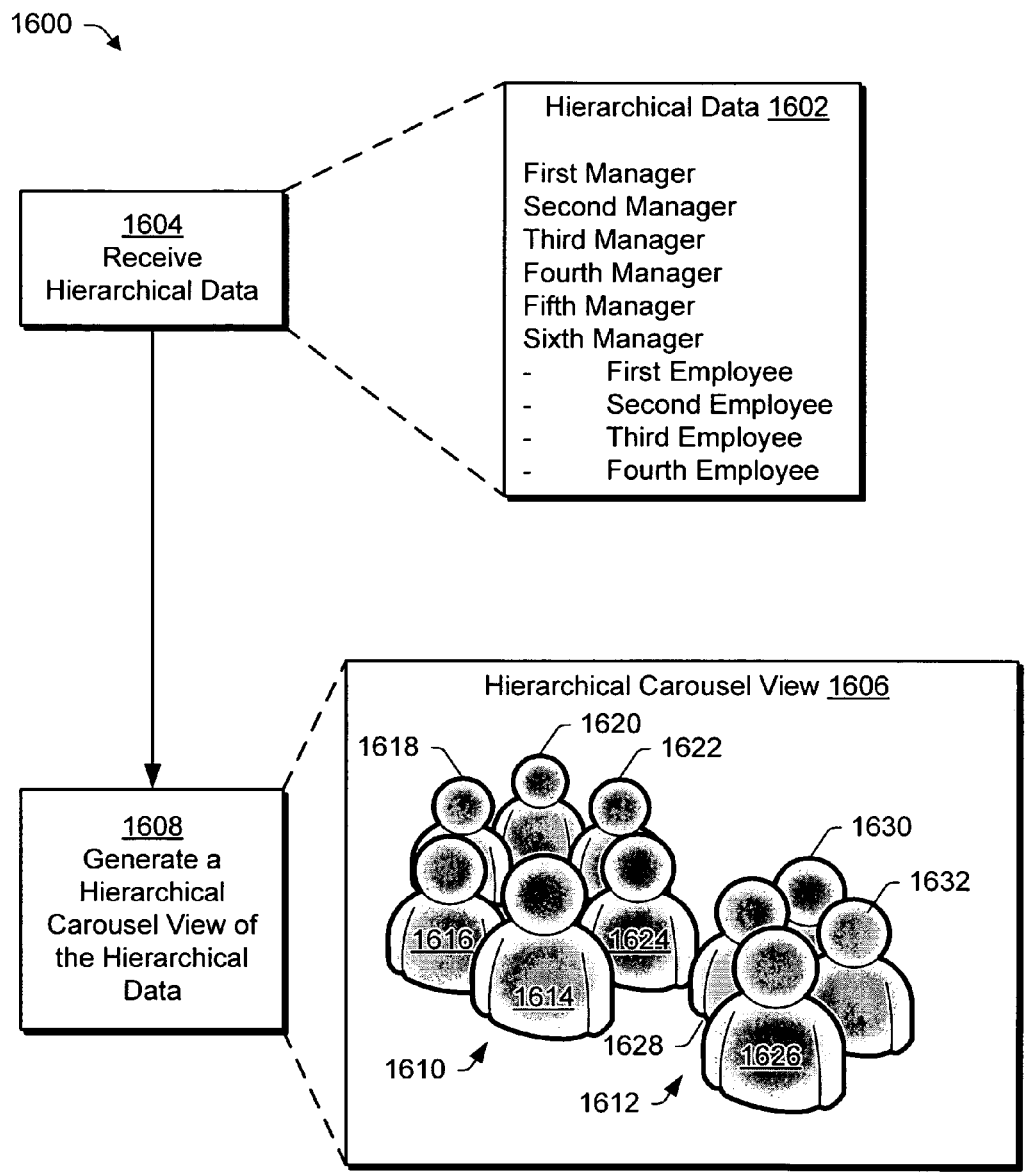
FIG. 16 is a flow diagram depicting a procedure in an exemplary implementation in which a hierarchical carousel view is generated for hierarchical data.

FIG. 16 is a flow diagram depicting a procedure 1600 in an exemplary implementation in which a hierarchical carousel view is generated for hierarchical data. Hierarchical data 1602 is received (block 1604). As previously described in relation to FIG. 1, hierarchical data may be received in a variety of ways, such as locally on the computing device 102 through execution of one or more applications 158(*n*), remotely from over the network 160, and so on. The hierarchical data 1602 may include a plurality of hierarchical levels. For example, the hierarchical data 1602 as illustrated in FIG. 16 include a first hierarchical level having a collection of managers and a second hierarchical level having a collection of employees. The collection of employees (illustrated as First through Fourth Employees in FIG. 16) is related to a particular one of the managers (illustrated as the Sixth Manager of the hierarchical data 1602). Thus, the hierarchical data 1602 includes a plurality of hierarchical levels and also indicates a relationship between the levels.

A hierarchical carousel view 1606 is then generated from the hierarchical data 1602 (block 1608). For example, the CV module 110 of FIG. 1, when executed, may generate first and second carousels 1610, 1612 which represent respective hierarchical levels of the hierarchical data 1602. The first carousel 1610 represents the manager hierarchical level, and therefore includes a bin representing each item in the hierarchical data 1602 at that level. In this instance, bins 1614-1624 represent the first through the sixth managers, respectively. Likewise, bins 1626-1632 of the second carousel 1612 represent the employee hierarchical level, and therefore each bin represents a corresponding item (i.e., employee) in the hierarchical data 1602 at that level, which is this instance is illustrated as the first through the fourth employees.

To represent the relationship of hierarchical levels in the hierarchical data 1602, a variety of techniques may be employed. As illustrated in FIG. 16, the second carousel 1612 is positioned adjacent to bin 1624, which corresponds to the sixth manager of the first carousel 1610. In other implementations, a line may be drawn between the bin 1624 and the second carousel 1612, a border may be provided which surrounds both the bin 1624 and the second carousel 1612 (e.g., a droplet of water may be displayed which surrounds the second carousel 1612 and the bin 1624), and so on. Thus, the hierarchical carousel view 1606 may represent the hierarchical levels in the hierarchical data 1602 and the relationships, if any, between those hierarchical levels. It should be noted that the bins in the hierarchical carousel view 1606, and other carousel views discussed elsewhere in this document, may be configured in a variety of ways to represent corresponding items, such as a representation of a user for each of the persons described in the hierarchical data 1602 as illustrated in FIG. 16.

Figure 17:
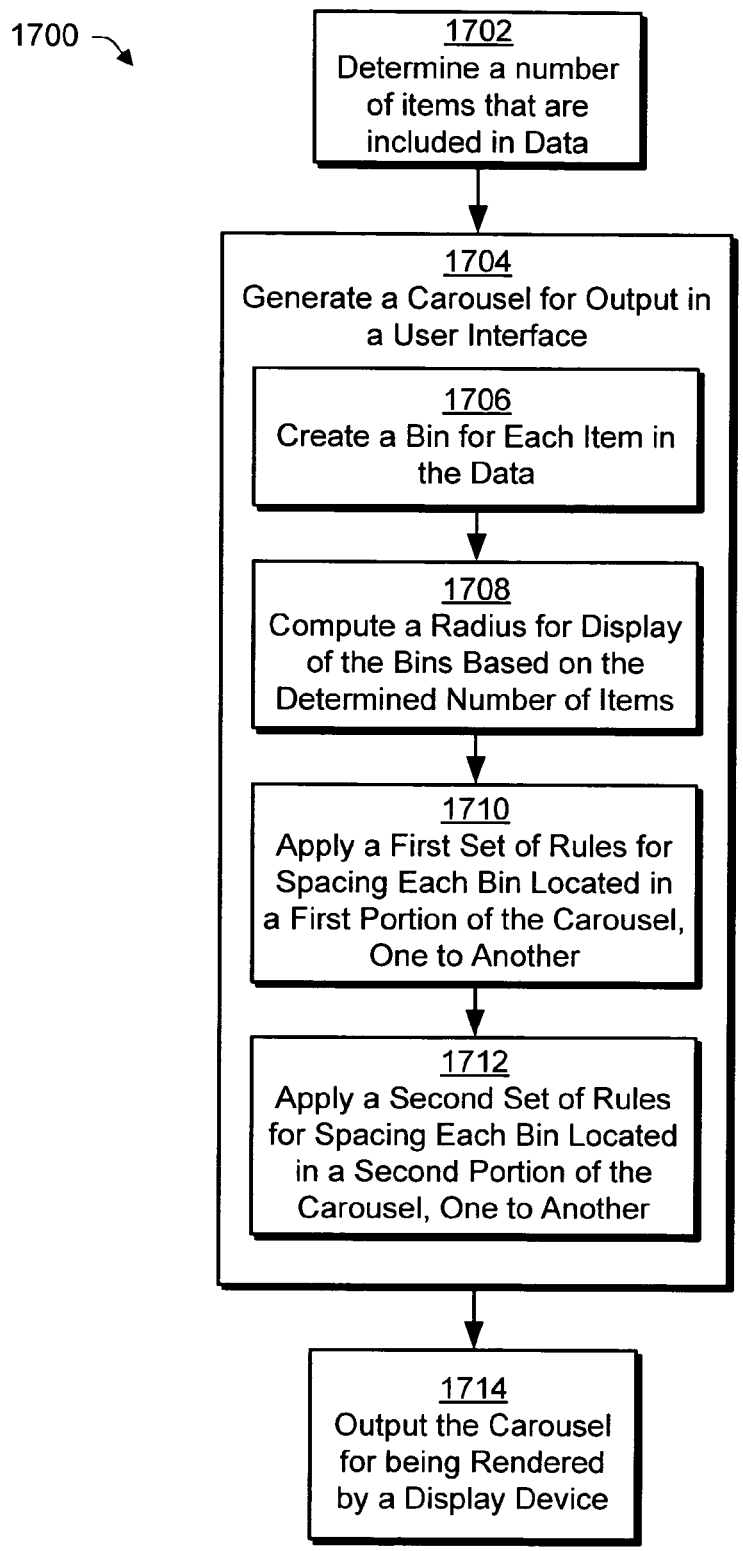
FIG. 17 is a flow diagram depicting a procedure in an exemplary implementation in which a carousel is generated having a radius based on a number of items represented by the carousel and bins that are spaced according to differing spacing rules.

FIG. 17 is a flow diagram depicting a procedure 1700 in an exemplary implementation in which a carousel is generated having a radius based on a number of items represented by the carousel and bins in the carousel are spaced according to different spacing rules. A determination is first made to find a number of items included in data (block 1702). For example, the data may be a playlist having a number of songs, a web search result describing a plurality of web pages, an organizational chart describing a plurality of employees, and so on.

A carousel for output in a user interface is then generated to represent the data (block 1704). Generation of the carousel may include a variety of different steps. For instance, a bin may be created for each item in the data (block 1706). The bins may be created in a variety of ways, such as generic bins, bins that describe the corresponding items in the data (e.g., a representation of an employee for each employee in an organizational chart), and so on. A radius is computed for display of the bins based on the determined number of items (block 1708). As previously described in relation to FIG. 7, the radius may be computed utilizing a square root function and/or a variety of other functions.

A first set of rules is applied for spacing each bin, one to another, located in a first portion of the carousel (block 1710). A second set of rules is applied for spacing each bin, one to another, located in a second portion of the carousel (block 1712). Thus, the carousel may support different spacing between bins in the carousel for display in a user interface. For example, as described in relation to FIG. 9, an ideal arc length "L" 804 may be computed for bins located in the "front" of the carousel 900. An angle "T" 802, for instance, may be computed to provide that ideal arc length "L" 804. Equations utilized to provide this spacing may be referred to as the first set of rules. To space bins located at the "back" of the carousel 900 of FIG. 9, an angle "U" 902 is computed according to a second set of rules.

The carousel is then output for being rendered by a display device (block 1714). For example, the computing device 102 of FIG. 1 may output a user interface that includes the generated carousel for being rendered by the display device 104.

Figure 18:
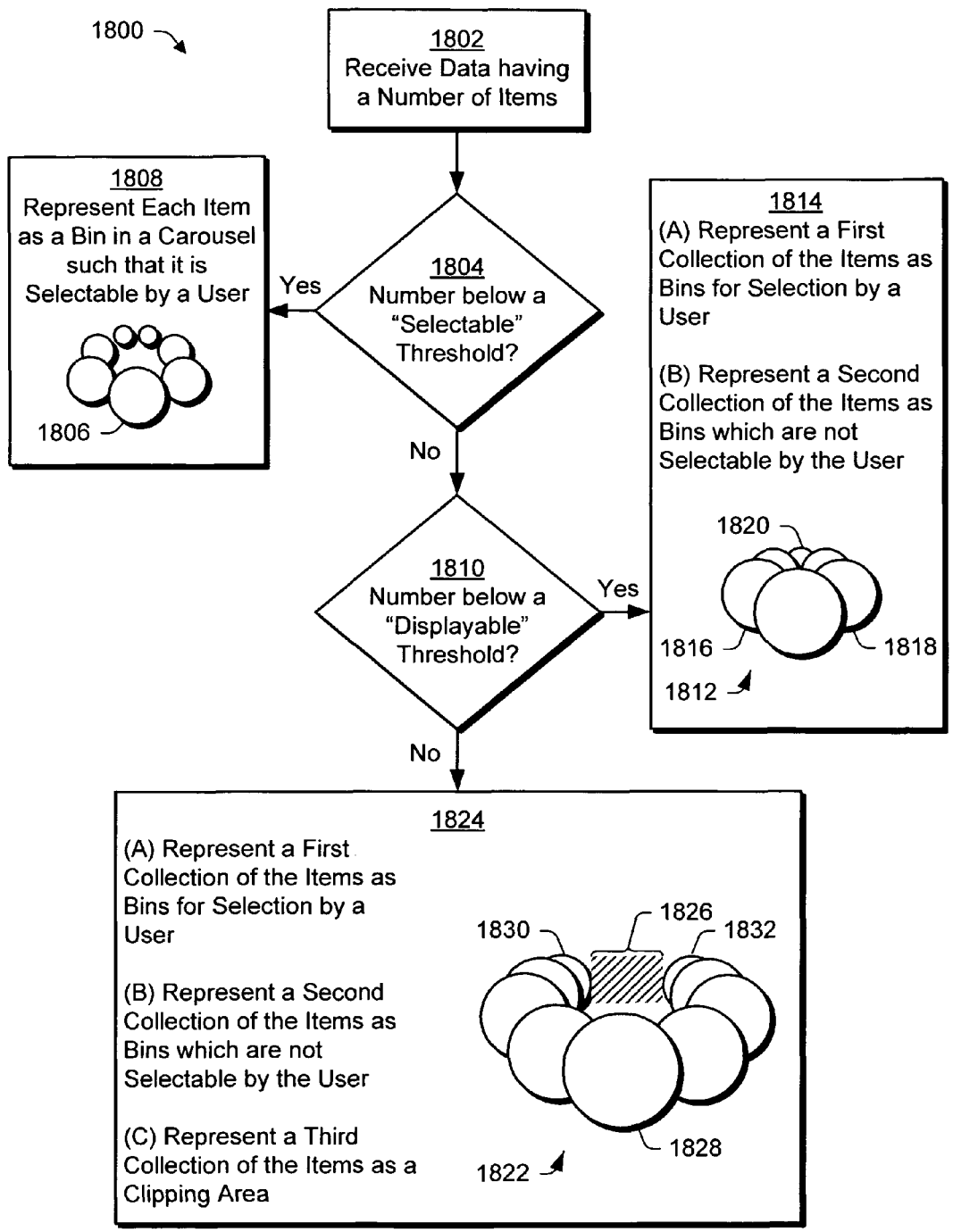
FIG. 18 is a flow diagram depicting a procedure in an exemplary implementation in which a carousel is generated having bins that are arranged for selection by a user based on a number of items to be represented by the carousel.

FIG. 18 is a flow diagram depicting a procedure 1800 in an exemplary implementation in which a carousel is generated having bins that are arranged for selection by a user based on a number of items to be represented by the carousel. As before, data is received having a number of items (block 1802). A determination is then made as to whether the number of items is below a "selectable" threshold (decision block 1804). For example, the CV module 110 of FIG. 1 may be executed to determine whether the number of items in the data is below a selectable threshold which is predetermined to indicate a number of bins which can be properly displayed by a carousel in a user interface at any one time. The selectable threshold may be computed in a variety of ways, such as based on a desired size (e.g., number of pixels) to be included in the bin, an ideal arc length, and so on.

If the number is below the selectable threshold (decision block 1804), each item in the data is represented as a bin in a carousel 1806 such that the bin is selectable by a user (block 1808). For example, each bin of carousel 1806 is displayed such that it may be selected by a user utilizing an input device, such as a mouse. Therefore, if the number of items in the data is below the selectable threshold, each item is represented by a corresponding bin that may be selected by a user without rotating (e.g., spinning) the carousel.

If the number is not below (e.g., is above) the selectable threshold (decision block 1804), a determination is made as to whether the number is below a "displayable" threshold (decision block 1810). The displayable threshold defines an amount of bins that may be included in a carousel for display, including bins which are not selectable by a user. If the number is below the displayable threshold (decision block 1808), then a carousel 1812 is generated having first and second collections of the items. The first collection of items is represented as bins for selection by a user, while the second collection of items are represented as bins which are not selectable by the user (block 1814). For example, bins 1816, 1818 may represent corresponding items and are selectable by a user utilizing an input device. Bin 1820, however, is positioned "behind" the other bins of the carousel 1812 and as such is not selectable by a user.

If the number is not below the displayable threshold (decision block 1808), then a carousel 1822 is generated for first, second, and third collections of the items. As before, the first collection of items is represented as bins for selection by a user, while the second collection of items are represented as bins which are not selectable by the user (block 1824). In this instance, however, a third collection of items is also defined for items which are not concurrently displayable with items in the first and second collections. For example, the display threshold may define a limit of an amount of bins that are displayable in the user interface in the carousel 1822 at any one time. Therefore, the third collection of items may be represented as a clipping area 1826. The illustrated carousel 1822 thus represents the first collection of items which are represented as selectable bins (e.g., bin 1828), the second collection of items which are represent as non-selectable bins (e.g., bins 1830, 1832), and the third collection of items represented as the clipping area 1826. In another implementation, a carousel may be provided in which each of the bins are selectable, with other items which are not concurrently displayable in the user interface as bins being represented by a clipping area, i.e. there are no bins displayed in the carousel in this implementation that are not selectable.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method implemented by a processor executing processor-executable instructions stored on computer-readable storage media, the method comprising:

receiving hierarchical data, the hierarchical data including a plurality of hierarchical levels;

generating, by the processor, a hierarchical carousel view of the hierarchical data for output in a user interface, the hierarchical carousel view comprising a plurality of carousels, each of the plurality of carousels being associated with a hierarchical level, and each of the plurality of carousels including a plurality of bins;

displaying a carousel of the plurality of carousels, the carousel comprising a first collection of the bins arranged in a first ring;

expanding a plurality of the bins of the first ring contemporaneously to display a plurality of expanded bins as a single second ring of the carousel, the second ring of the carousel being displayed as an outer ring of the carousel, concentric with the first ring of the carousel and having a larger radius than the first ring of the carousel, which is displayed as an inner ring of the carousel relative to the outer second ring, the inner first ring containing at least one bin that has not been expanded and the outer second ring containing the plurality of expanded bins;

displaying the expanded bins as having respective additional carousels arranged in the second ring, the additional carousels corresponding to a different hierarchical level than the carousel having the first ring, each additional carousel being tangential to a respective expanded bin in the outer second ring;

closing the inner first ring of the carousel to display the outer second ring of the carousel, including the tangential additional carousels, without displaying the inner first ring of the carousel; and following the closing of the inner first ring, contracting the second ring to a smaller radius determined based on a number of the expanded bins in the second ring.

2. A method as described in claim 1, wherein: the hierarchical data includes a plurality of items; and each said bin represents a corresponding said item.

3. A method as described in claim 1, wherein, prior to closing the inner first ring, the carousel includes a plurality of unexpanded bins in the inner first ring and the plurality of expanded bins in the outer second ring.

4. A method as described in claim 3, further comprising rotating the inner first ring of the carousel to view additional unexpanded bins in the inner first ring, while the outer second ring containing the plurality of expanded bins is locked from rotation to prevent the additional carousels from overlapping.

5. A method as described in claim 1, wherein:
a first group of said first collection of bins is spaced, one to another, in the first ring of the carousel according to a first set of rules;
a second group of said first collection of bins is spaced, one to another, in the first ring of the carousel according to a second set of rules;
the first group is displayed to appear closer to a user and the second group is displayed to appear further from the user; and
when the user clicks on a particular one of the bins in the second group, the first ring of the carousel rotates to display the particular bin to appear closest to the user.

6. A computing device comprising the processor and a memory configured to maintain one or more modules that are executable on the processor to perform the method of claim 1.

7. One or more computer-readable storage media comprising the processor-executable instructions that, when executed by the processor on a computer, direct the computer to perform the method of claim 1.

8. A method implemented by a processor executing processor-executable instructions stored on computer-readable storage media, the method comprising:
determining a number of items that are included in data;
generating a first carousel, which includes a clipping area for use when the number of items is too great to be concurrently displayed in a user interface;
displaying the first carousel as having a plurality of bins arranged in a first ring, each of which represents a corresponding said item, the first ring of the first carousel having a first radius for display of each said bin based on the determined number of said items;
displaying a first collection of said bins as being spaced in the first ring of the first carousel according to a first set of rules to be initially displayed and a second collection of said bins as being spaced in the first ring of the first carousel within the clipping area according to a second set of rules as to not be displayed until the first ring of the first carousel is rotated;
expanding multiple bins of the first ring of the first carousel simultaneously to display the multiple bins as a second ring of the first carousel, the multiple bins expanded as the second ring of the first carousel being expanded as multiple second carousels, the second carousels being tangentially positioned adjacent to a corresponding one of the multiple bins expanded as the second ring of the first carousel;
closing the first ring of the first carousel to display the second ring of the first carousel without displaying the first ring of the first carousel; and
following the closing of the inner first ring, contracting the second ring to a smaller radius determined based on a number of the multiple bins expanded in the second ring.

9. A method as described in claim 8, wherein:
the data is hierarchical data;
a first plurality of said items is included in a first hierarchical level and a second plurality of said items is included in a second hierarchical level;
the generated first carousel includes a plurality of said bins representing the first plurality of said items; and
the second carousels include a second plurality of said bins representing the second plurality of said items.

10. A method as described in claim 9, wherein the generated first carousel and the second carousels are arranged, one to another, in the user interface to indicate the first and second hierarchical levels, respectively.

11. A method as described in claim 8, wherein the first radius is computed utilizing a square root function.

12. A method as described in claim 8, further comprising rotating the first ring of the first carousel to view additional bins in the first ring, while the second ring containing the multiple bins expanded from the first ring as the second carousels is locked from rotation to prevent the second carousels from overlapping.

13. A method as described in claim 8, wherein at least two said bins are arranged according to an ideal arc length.

14. One or more computer-readable storage media comprising the processor-executable instructions that, when executed by the processor on a computer, direct the computer to perform the method of claim 8.

15. One or more computer-readable storage media comprising computer executable instructions that, when executed by a processor on a computer, direct the computer to arrange a plurality of bins to form a first carousel for output to a display by performing operations comprising:
applying a first set of rules for spacing each said bin, one to another, located in a first portion of a first ring of the first carousel such that when the first portion is rendered, the first portion is initially displayed;

applying a second set of rules for spacing each said bin, one to another, located in a second portion of the first ring of the first carousel such that when the second portion is rendered the second portion is not initially displayed but is instead within a clipping area until the first carousel is rotated;

when rendered, said bins located in the first portion of the first ring of the first carousel being displayed towards a front of the display for selection by a user, with the clipping area being displayed towards a rear of the display area, said bins located in the first portion of the first carousel being spaced further apart according to the first set of rules than are said bins which are not located in the first portion of the first ring of the first carousel;

expanding multiple bins of the first ring of the first carousel simultaneously to display a second ring of the first carousel, the second ring of the first carousel being displayed as an outer ring concentric with the first ring of the first carousel and having a second radius that is larger than a first radius of the first ring of the first carousel which is displayed as an inner ring relative to the outer second ring of the first carousel, the multiple bins expanded as multiple second carousels displayed in the second ring of the first carousel, each second carousel being tangential to a respective one of the multiple bins expanded from the first ring of the first carousel;

closing the inner first ring of the first carousel to display the outer second ring of the first carousel without displaying the inner first ring of the first carousel; and following the closing of the inner first ring, contracting the outer second ring to a smaller radius determined based on a number of the multiple bins expanded in the second ring.

16. One or more computer-readable storage media as described in claim 15, wherein the first and second portions of the first ring of the first carousel, when rendered, are displayed such that the first portion appears in front of the second portion.

17. One or more computer-readable storage media as described in claim 15, wherein the application of the first set of rules results in a spacing of said bins located in the first portion of the first ring of the first carousel according to an ideal arc length.

18. One or more computer-readable storage media as described in claim 15, wherein:

the application of the first set of rules results in a first spacing of each said bin, one to another, located in the first portion of the first ring of the first carousel;

the application of the second set of rules results in a second spacing of each said bin, one to another, located in the second portion of the first ring of the first carousel; and the second spacing is less than the first spacing.

19. One or more computer-readable storage media comprising computer executable instructions that, when executed by a processor on a computer, direct the computer to output a user interface having at least one carousel that represents a plurality of items from a hierarchical level, the at least one carousel, when output, comprising:

a plurality of bins representing a first collection of the items, the first collection of items being initially displayed as a first ring in the user interface;

a clipping area on the first ring of the carousel representing a second collection of the items from a same hierarchical level as the first collection of the items;

the second collection of items within the clipping area not being displayed until the first ring of the carousel is rotated when the carousel includes more items than can be concurrently displayed in the user interface;

the first collection of items being initially displayed towards a front of a display area for selection via the user interface;

the clipping area being initially displayed towards a rear of the display area and not positioned for selection via the user interface; and expanding multiple bins of the first ring of the carousel contemporaneously as expanded bins displayed in a second ring of the carousel, the second ring of the carousel being displayed as an outer ring of the carousel concentric with the first ring of the carousel and having a second radius that is larger than a first radius of the first ring of the carousel which is displayed as an inner carousel relative to the outer second ring of the carousel, at least one of the expanded bins being expanded as an additional carousel tangentially positioned adjacent to a respective expanded bin in the second ring of the carousel;

closing the inner first ring of the carousel to display the outer second ring of the carousel, including the at least one tangential additional carousel, without displaying the inner first ring of the carousel; and following the closing of the inner first ring, contracting the second ring to a smaller radius determined based on a number of the expanded bins in the second ring.

20. One or more computer-readable storage media as described in claim 19, wherein each said bin is selectable to output a corresponding one of the first collection of the items.

21. One or more computer-readable storage media as described in claim 19, wherein the clipping area is not selectable to output said items included in the second collection.

22. One or more computer-readable storage media as described in claim 19, wherein each of the multiple expanded bins is expanded as a respective additional carousel displayed tangentially positioned adjacent to a corresponding expanded bin in the second ring of the carousel.

23. A computing device comprising:

a processor; and a memory configured to maintain one or more modules that are executable on the processor to:

represent items of data using a corresponding plurality of bins arranged in a first ring of a carousel such that the bins are selectable by a user;

display multiple bins of the first ring of the carousel as multiple expanded bins expanded contemporaneously and displayed in a second ring of the carousel, the second ring of the carousel being displayed as an outer ring of the carousel concentric with the first ring of the carousel and having a second radius that is larger than a first radius of the first ring of the carousel which is displayed as an inner ring of the carousel relative to the outer second ring of the carousel, the outer second ring containing the multiple expanded bins and the inner first ring containing a subset of bins that have not been expanded;

close the inner first ring of the carousel to display the outer second ring of the carousel without displaying the inner first ring of the carousel; and following closing of the inner first ring, contract the outer second ring having the expanded bins to a smaller radius determined based on a number of the expanded bins in the outer second ring.

24. A computing device as described in claim 23, wherein the one or more modules are further executable to calculate the first radius for the first ring of the carousel based on the number of items.

25. A computing device as described in claim 24, wherein the first radius is calculated utilizing a square root function.

26. A computing device as described in claim 23, wherein the one or more modules are further executable to:
   receive the data that includes a plurality of hierarchical levels; and
   generate a hierarchical carousel view of the data.

27. A computing device as described in claim 26, wherein the hierarchical carousel view includes the carousel having the first ring and a plurality of additional carousels that each correspond to and positioned tangentially to a respective one of the expanded bins.

28. A computing device as described in claim 23, wherein:
   each said bin located in a first portion of the first ring of the carousel is spaced according to a first set of rules;
   each said bin located in a second portion of the first ring of the carousel is spaced according to a second set of rules; and
   the spacing of the first portion of the first ring of the carousel differs from the spacing of the second portion of the first ring of the carousel.

29. A computing device as described in claim 27, the one or more modules being further executable to rotate the inner first ring of the carousel for displaying additional bins in the inner first ring of the carousel, while preventing rotation of the outer second ring containing the multiple expanded bins expanded from the first ring of the carousel to prevent the plurality of additional carousels from overlapping.

30. A computing device as described in claim 23, wherein the first ring of the carousel and the second ring of the carousel comprises a three-dimensional depiction.

31. A computing device as described in claim 23, wherein each said bin in the first ring of the carousel is positioned according to a first radius that is computed to be proportional to the number of said bins included in the first ring of the carousel.

* * * * *